US012604010B2

(12) United States Patent
Deng et al.

(10) Patent No.: US 12,604,010 B2
(45) Date of Patent: Apr. 14, 2026

(54) METHOD, DEVICE, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Zhipin Deng, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 6 days.

(21) Appl. No.: 18/607,278

(22) Filed: Mar. 15, 2024

(65) Prior Publication Data

US 2024/0223778 A1      Jul. 4, 2024

Related U.S. Application Data

(63) Continuation of application No. PCT/CN2022/119164, filed on Sep. 15, 2022.

(30) Foreign Application Priority Data

Sep. 15, 2022    (WO) ................ PCT/CN2022/119164

(51) Int. Cl.
*H04N 19/00* (2014.01)
*G06V 10/75* (2022.01)
(Continued)

(52) U.S. Cl.
CPC ......... *H04N 19/159* (2014.11); *G06V 10/751* (2022.01); *H04N 19/139* (2014.11); *H04N 19/176* (2014.11); *H04N 19/70* (2014.11)

(58) Field of Classification Search
CPC .................................................... H04N 19/00
See application file for complete search history.

(56) References Cited

U.S. PATENT DOCUMENTS

2018/0199057 A1    7/2018  Chuang et al.
2020/0068218 A1    2/2020  Chen et al.
(Continued)

FOREIGN PATENT DOCUMENTS

CN          101867814 A    10/2010
CN          111294590 A     6/2020
WO        2021058033 A1     4/2021

OTHER PUBLICATIONS

International Search Report in PCT/CN2022/119164, mailed Nov. 28, 2022, 3 pages.

*Primary Examiner* — Maryam A Nasri
(74) *Attorney, Agent, or Firm* — Astute IP Law Group

(57) ABSTRACT

Embodiments of the present disclosure provide a solution for video processing. A method for video processing is proposed. The method comprises: determining, during a conversion between a target block of a video and a bitstream of the target block, a first prediction and a second prediction associated with the target block, the target block being applied with a multiple hypothesis prediction coding mode; applying a process associated with a template of the target block to the target block by blending the first and second predictions; and performing the conversion according to the process associated with the template.

21 Claims, 23 Drawing Sheets

(51) Int. Cl.
　　*H04N 19/139*　　　(2014.01)
　　*H04N 19/159*　　　(2014.01)
　　*H04N 19/176*　　　(2014.01)
　　*H04N 19/70*　　　(2014.01)

(56)　　　　　　　　References Cited

U.S. PATENT DOCUMENTS

2020/0154124　A1　　　5/2020　Lee et al.
2021/0392367　A1*　12/2021　Zhang ..................... G06T 7/231

* cited by examiner

910

HORIZONTAL

VERTICAL

W

H

ORIGINAL HxW PARTITION

W

H/2

W/2

H

920

HORIZONTAL

VERTICAL

W

ORIGINAL HxW PARTITION

W

H/4

W/4

H

1100

1200

1300

1400

1500

4×4 block

6×6 surrounding region samples & gradients padding 810 prediction samples in the extended area 820 prediction samples within the CU

1600

2000

2110

2200

2300

2310

DETERMINE A FIRST PREDICTION AND A SECOND PREDICTION ASSOCIATED WITH THE TARGET BLOCK

2320

APPLY A PROCESS ASSOCIATED WITH A TEMPLATE OF THE TARGET BLOCK TO THE TARGET BLOCK BY BLENDING THE FIRST AND SECOND PREDICTIONS

2330

PERFORM THE CONVERSION ACCORDING TO THE PROCESS ASSOCIATED WITH THE TEMPLATE

2400

2410

DETERMINE PREDICTION DATA OF THE TARGET BLOCK BASED ON
CODED INFORMATION OF THE TARGET BLOCK

2420

PERFORM THE CONVERSION BASED ON THE PREDICTION DATA

2500

2510

DETERMINE MOTION DATA OF A SET OF ADDITIONAL HYPOTHESIS
CANDIDATES OF THE TARGET BLOCK

2520

REORDER THE MOTION DATA

2530

PERFORM THE CONVERSION BASED ON THE REORDERED MOTION
DATA

2600

2610

DETERMINE AN ADDITIONAL HYPOTHESIS OF THE TARGET BLOCK

2620

REFINE A SET OF MOTION CANDIDATES OF THE ADDITIONAL HYPOTHESIS OF THE TARGET BLOCK

2630

PERFORM THE CONVERSION BASED ON THE REFINED SET OF MOTION CANDIDATES

Figures 27, 28:
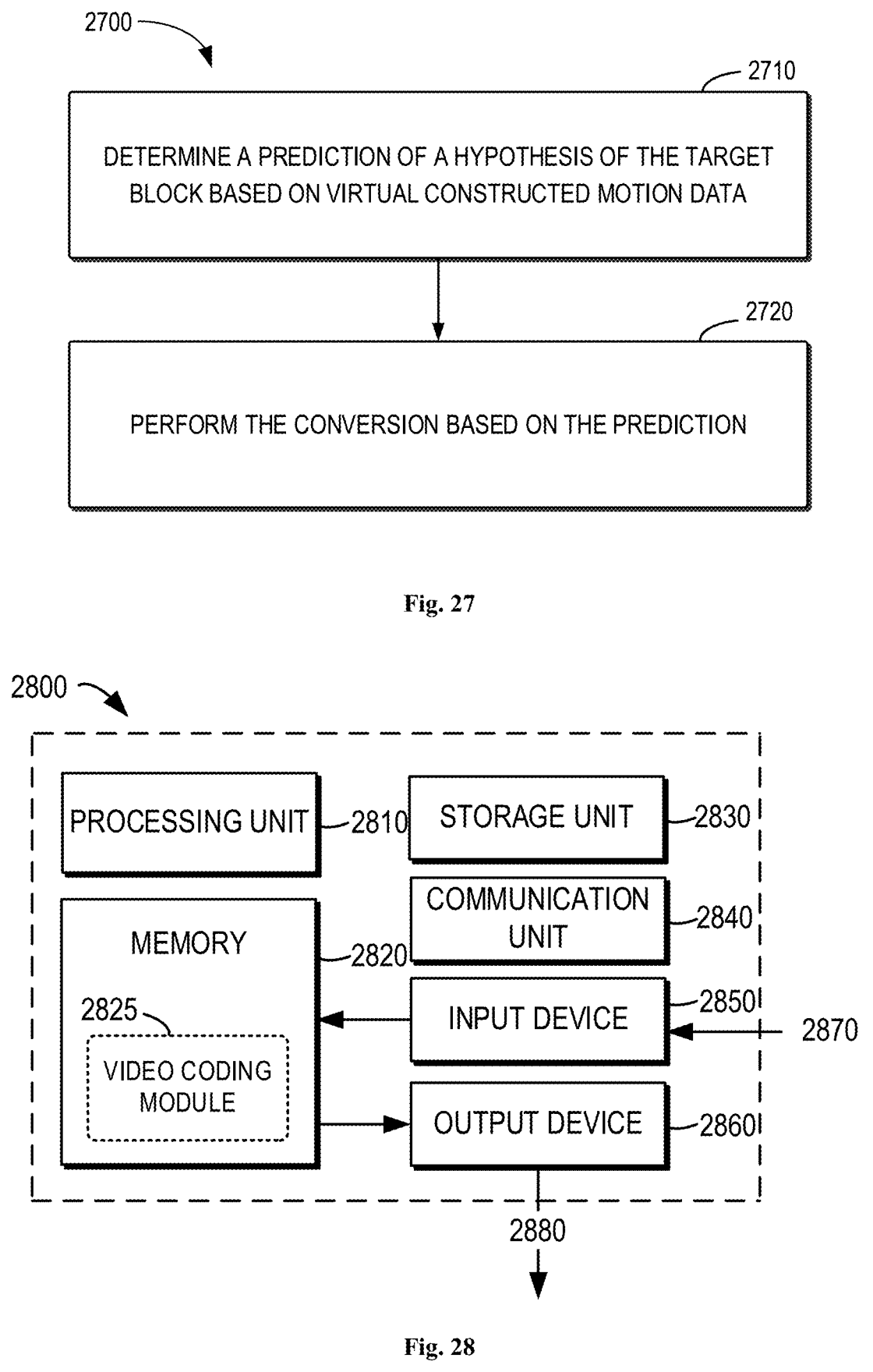

2700

2710

DETERMINE A PREDICTION OF A HYPOTHESIS OF THE TARGET BLOCK BASED ON VIRTUAL CONSTRUCTED MOTION DATA

2720

PERFORM THE CONVERSION BASED ON THE PREDICTION

PROCESSING UNIT —2810

STORAGE UNIT —2830

COMMUNICATION UNIT —2840

MEMORY —2820

2825

VIDEO CODING MODULE

INPUT DEVICE —2850

2870

OUTPUT DEVICE —2860

METHOD, DEVICE, AND MEDIUM FOR VIDEO PROCESSING

CROSS-REFERENCE TO RELATED APPLICATIONS

This application is a continuation of International Application No. PCT/CN2022/119164, filed on Sep. 15, 2022, which claims the benefit of International Application No. PCT/CN2021/118876 filed on Sep. 16, 2021. The entire contents of these applications are hereby incorporated by reference in their entireties.

FIELD

Embodiments of the present disclosure relates generally to video coding techniques, and more particularly, to signaling of multiple hypothesis prediction in image/video coding.

BACKGROUND

In nowadays, digital video capabilities are being applied in various aspects of people's' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally low, which is undesirable.

SUMMARY

Embodiments of the present disclosure provide a solution for video processing.

In a first aspect, a method for video processing is proposed. The method comprises: determining, during a conversion between a target block of a video and a bitstream of the target block, a first prediction and a second prediction associated with the target block, the target block being applied with a multiple hypothesis prediction coding mode; applying a process associated with a template of the target block to the target block by blending the first and second predictions; and performing the conversion according to the process associated with the template. Compared with the conventional solution, the proposed method can advantageously improve the coding efficiency and performance.

In a second aspect, another method for video processing is proposed. The method comprises: determining, during a conversion between a target block of a video and a bitstream of the target block, prediction data of the target block based on coding information of the target block; and performing the conversion based on the prediction data. Compared with the conventional solution, the proposed method can advantageously improve the coding efficiency and performance.

In a third aspect, another method for video processing is proposed. The method comprises: determining, during a conversion between a target block of a video and a bitstream of the target block, motion data of a set of additional hypothesis candidates of the target block; reordering the motion data; and performing the conversion based on the reordered motion data. Compared with the conventional solution, the proposed method can advantageously improve the coding efficiency and performance.

In a fourth aspect, another method for video processing is proposed. The method comprises: determining, during a conversion between a target block of a video and a bitstream of the target block, an additional hypothesis of the target block; refining a set of motion candidates of the additional hypothesis of the target block by a decoder side method; and performing the conversion based on the refined set of motion candidates. Compared with the conventional solution, the proposed method can advantageously improve the coding efficiency and performance.

In a fifth aspect, another method for video processing is proposed. The method comprises: determining, during a conversion between a target block of a video and a bitstream of the target block, a prediction of a hypothesis of the target block based on virtual constructed motion data; and performing the conversion based on the prediction. Compared with the conventional solution, the proposed method can advantageously improve the coding efficiency and performance.

In a sixth aspect, an apparatus for processing video data is proposed. The apparatus for processing video data comprising a processor and a non-transitory memory with instructions thereon, wherein the instructions upon execution by the processor, cause the processor to perform a method in accordance with the first aspect.

In a seventh aspect, an apparatus for processing video data is proposed. The non-transitory computer-readable storage medium stores instructions that cause a processor to perform a method in accordance with the first aspect.

In an eighth aspect, a non-transitory computer-readable recording medium is proposed. The non-transitory computer-readable recording medium stores a bitstream of a video which is generated by a method performed by a video processing apparatus, wherein the method comprises: determining a first prediction and a second prediction associated with a target block of the video, the target block being applied with a multiple hypothesis prediction coding mode; applying a process associated with a template of the target block by blending the first and second predictions; and generating a bitstream of the target block according to the process associated with the template.

In a ninth aspect, another method for video processing is proposed. The method for storing bitstream of a video, comprises: determining a first prediction and a second prediction associated with a target block of the video, the target block being applied with a multiple hypothesis prediction coding mode; applying a process associated with a template of the target block by blending the first and second predictions; generating a bitstream of the target block according to the process associated with the template; and storing the bitstream in a non-transitory computer-readable recording medium.

In a ten aspect, an apparatus for processing video data is proposed. The apparatus for processing video data comprising a processor and a non-transitory memory with instructions thereon, wherein the instructions upon execution by the processor, cause the processor to perform a method in accordance with the second aspect.

In an eleventh aspect, an apparatus for processing video data is proposed. The non-transitory computer-readable storage medium stores instructions that cause a processor to perform a method in accordance with the second aspect.

In a twelfth aspect, another non-transitory computer-readable recording medium is proposed. The non-transitory computer-readable recording medium storing a bitstream of a video which is generated by a method performed by a video processing apparatus, wherein the method comprises: determining prediction data of a target block of the video based on coding information of the target block; and generating a bitstream of the target block based on the prediction data.

In a thirteenth aspect, another method for video processing is proposed. The method for storing bitstream of a video, comprises: determining prediction data of a target block of the video based on coding information of the target block; generating a bitstream of the target block based on the prediction data; and storing the bitstream in a non-transitory computer-readable recording medium.

In a fourteenth aspect, an apparatus for processing video data is proposed. The apparatus for processing video data comprising a processor and a non-transitory memory with instructions thereon, wherein the instructions upon execution by the processor, cause the processor to perform a method in accordance with the third aspect.

In a fifteenth aspect, an apparatus for processing video data is proposed. The apparatus stores instructions that cause a processor to perform a method in accordance with the third aspect.

In a sixteenth aspect, another non-transitory computer-readable recording medium is proposed. The non-transitory computer-readable recording medium storing a bitstream of a video which is generated by a method performed by a video processing apparatus, where the method comprises: determining, motion data of a set of additional hypothesis candidates of a target block of the video; reordering the motion data; and generating a bitstream of the target block based on the reordered motion data.

In a seventeenth aspect, another method for video processing is proposed. The method for storing bitstream of a video, comprises: determining, motion data of a set of additional hypothesis candidates of a target block of the video; reordering the motion data; generating a bitstream of the target block based on the reordered motion data; and storing the bitstream in a non-transitory computer-readable recording medium.

In an eighteenth aspect, an apparatus for processing video data is proposed. The apparatus for processing video data comprising a processor and a non-transitory memory with instructions thereon, wherein the instructions upon execution by the processor, cause the processor to perform a method in accordance with the fourth aspect.

In a nineteenth aspect, an apparatus for processing video data is proposed. The apparatus stores instructions that cause a processor to perform a method in accordance with the fourth aspect.

In a twentieth aspect, another non-transitory computer-readable recording medium is proposed. The non-transitory computer-readable recording medium stores a bitstream of a video which is generated by a method performed by a video processing apparatus, wherein the method comprises: determining an additional hypothesis of a target block of the video; refining a set of motion candidates of the additional hypothesis of the target block by a decoder side method; and generating a bitstream of the target block based on the refined set of motion candidates.

In a twenty-first aspect, another method for video processing is proposed. The method for storing bitstream of a video, comprises: determining an additional hypothesis of a target block of the video; refining a set of motion candidates of the additional hypothesis of the target block by a decoder side method; generating a bitstream of the target block based on the refined set of motion candidates; and storing the bitstream in a non-transitory computer-readable recording medium.

In a twenty-second aspect, an apparatus for processing video data is proposed. The apparatus for processing video data comprising a processor and a non-transitory memory with instructions thereon, wherein the instructions upon execution by the processor, cause the processor to perform a method in accordance with the fifth aspect.

In a twenty-third aspect, an apparatus for processing video data is proposed. The non-transitory computer-readable storage medium stores instructions that cause a processor to perform a method in accordance with the fifth aspect.

In a twenty-fourth aspect, another non-transitory computer-readable recording medium is proposed. The non-transitory computer-readable recording medium stores a bitstream of a video which is generated by a method performed by a video processing apparatus, wherein the method comprises: determining a prediction of a hypothesis of a target block based of the video on virtual constructed motion data; and generating a bitstream of the target block based on the prediction.

In a twenty-fifth aspect, another method for video processing is proposed. The method for storing bitstream of a video, comprises: determining a prediction of a hypothesis of a target block based of the video on virtual constructed motion data; generating a bitstream of the target block based on the prediction; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 27 illustrates a flow chart of a method according to embodiments of the present disclosure; and FIG. 28 illustrates a block diagram of a computing device in which various embodiments of the present disclosure can be implemented.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
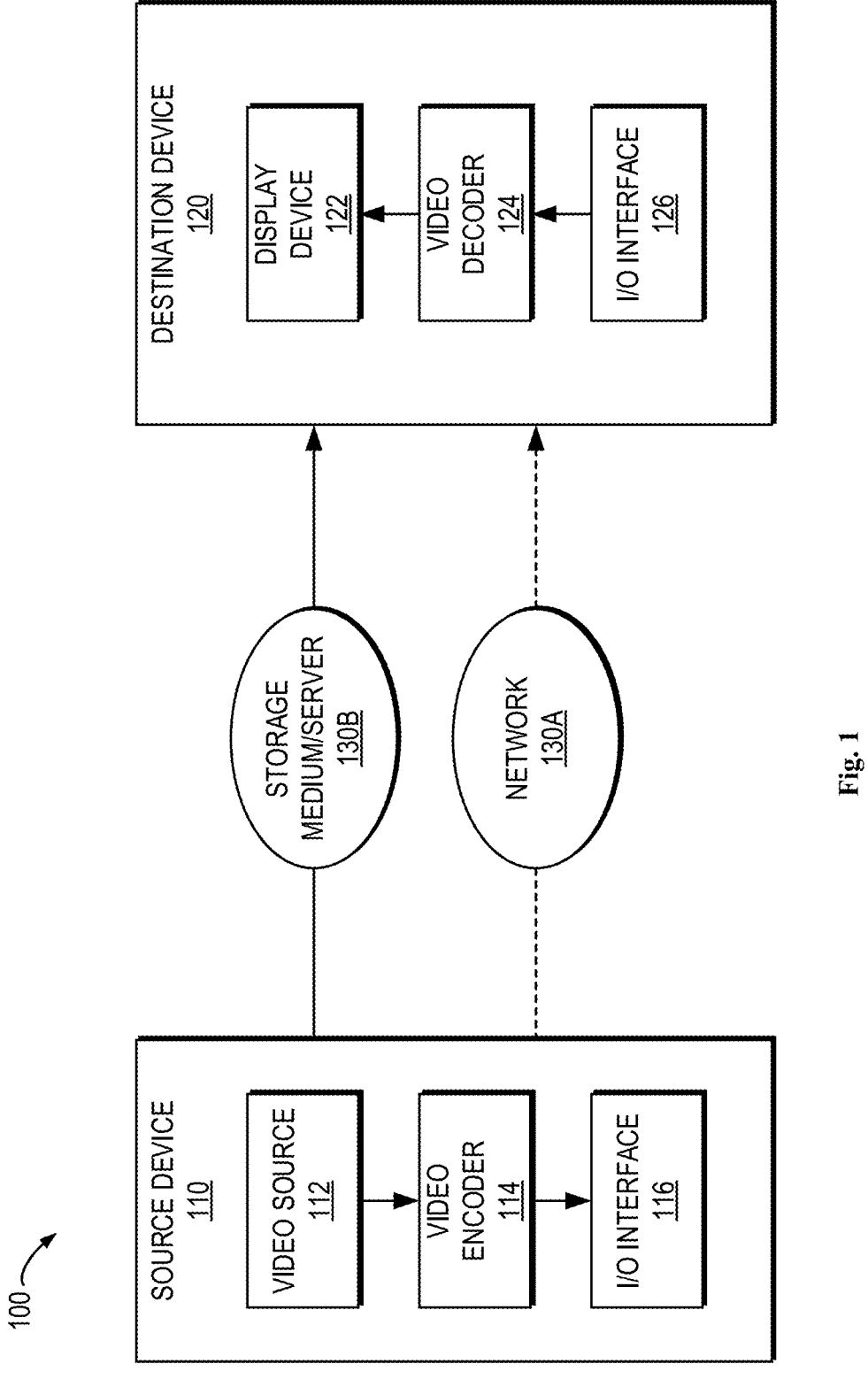
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
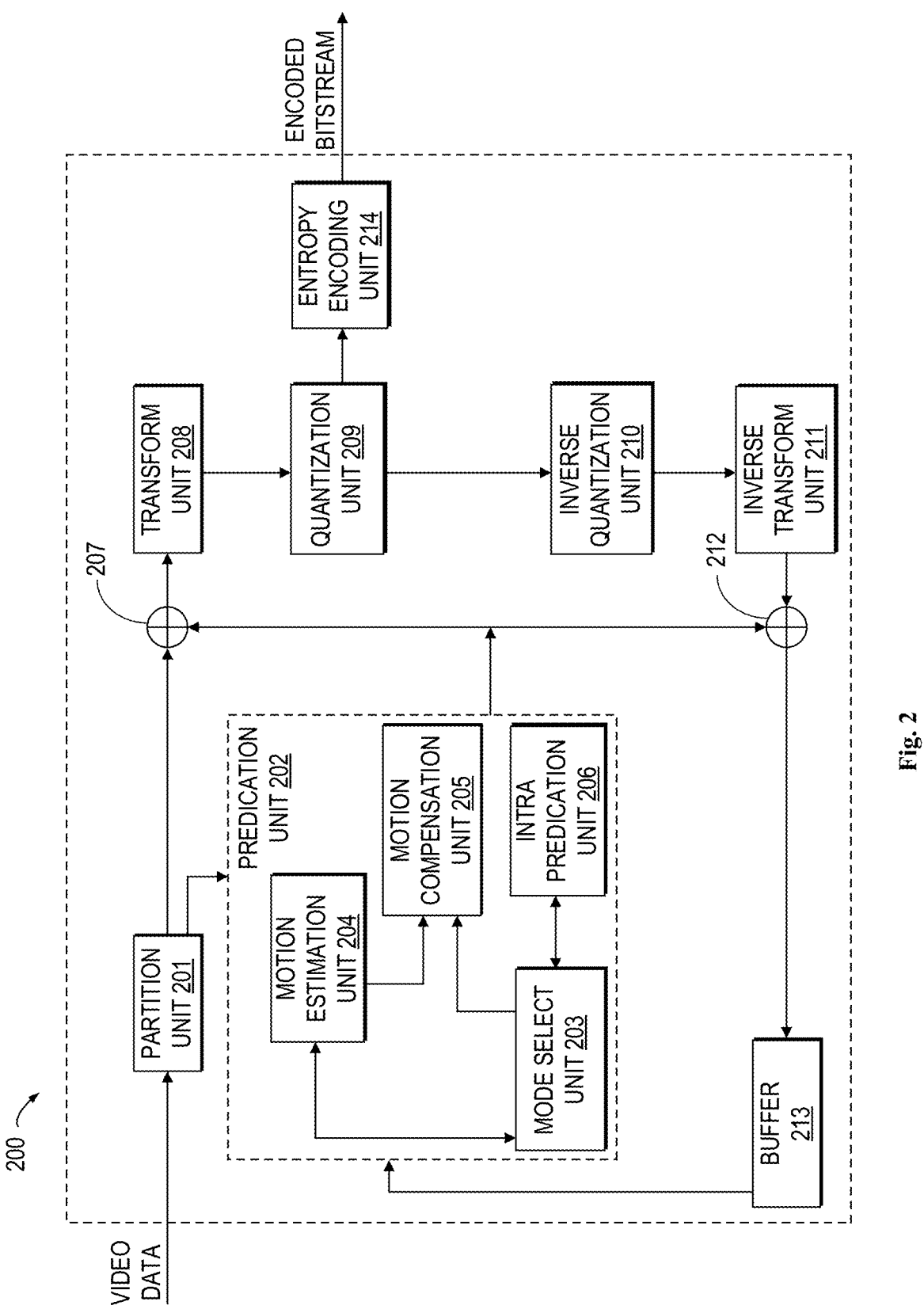
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
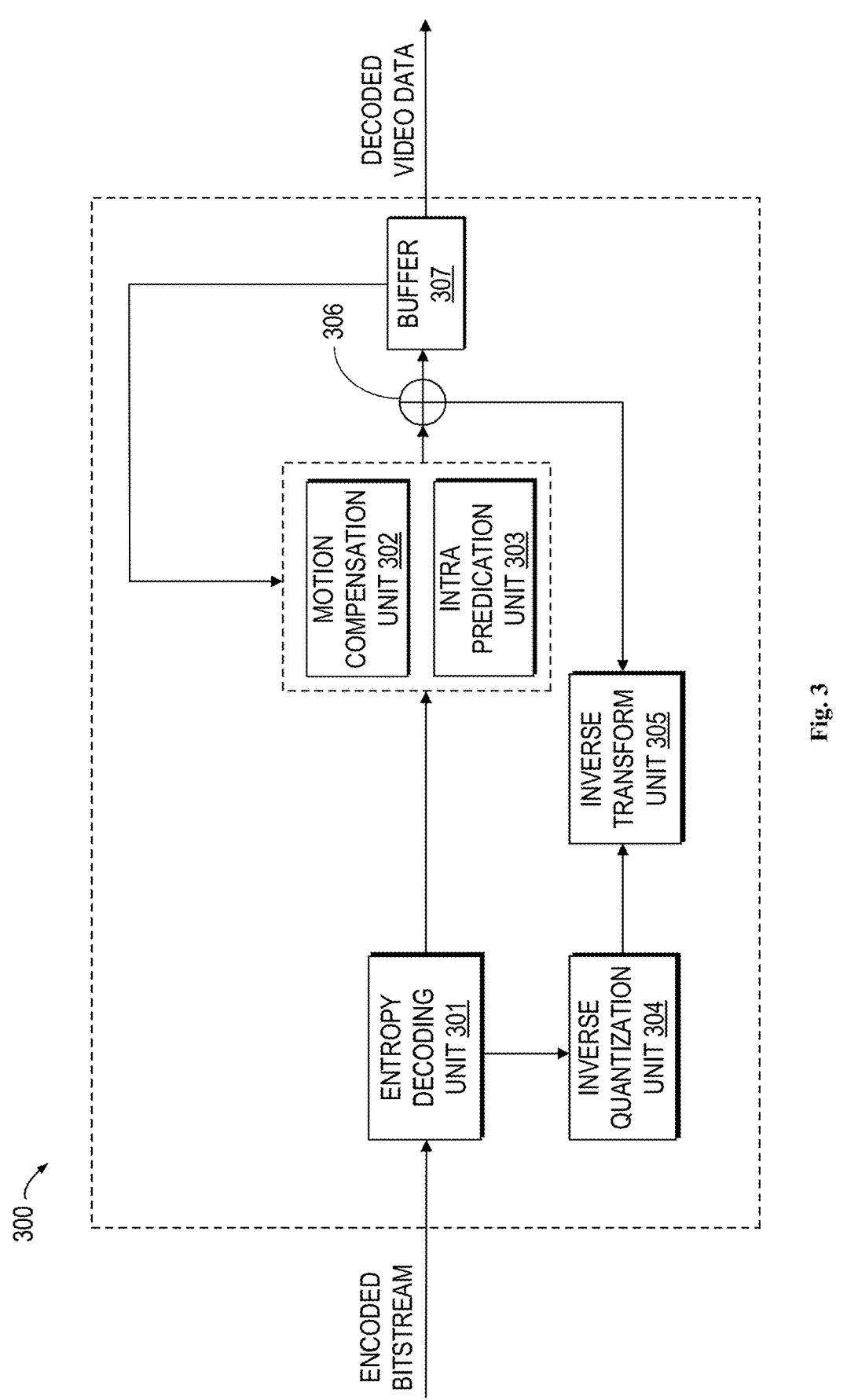
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

The present disclosure is related to video coding technologies. Specifically, it is about a prediction mode in which the prediction samples are generated from more than one prediction methods. It may be applied to the existing video coding standard like HEVC, VVC, and etc. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/ HEVC [1] standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting.

Figure 4:
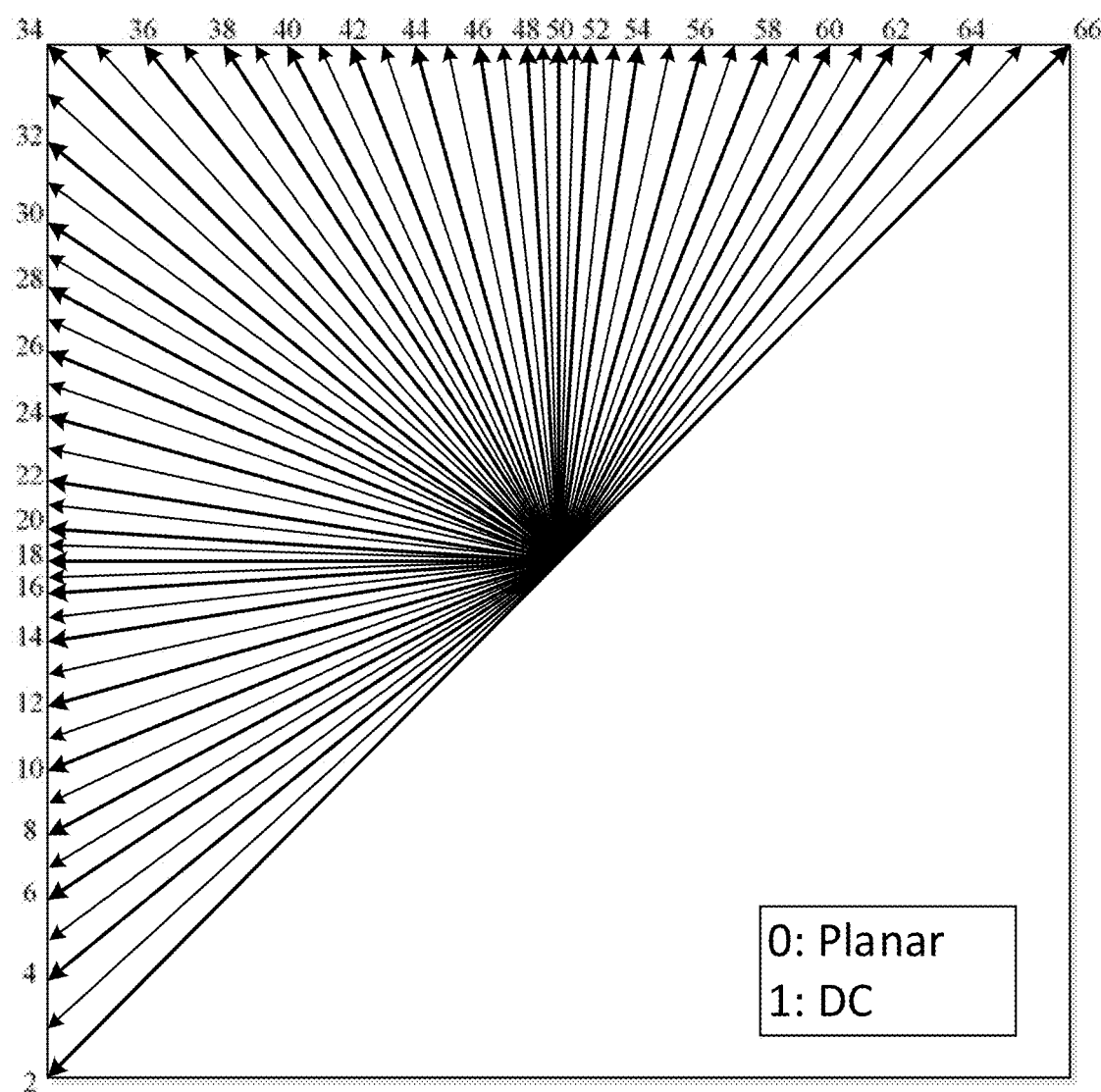
FIG. 4 is a schematic diagram of intra prediction modes.

2.1. Coding Tools 2.1.1. Intra Prediction 2.1.1.1. Intra Mode Coding with 67 Intra Prediction Modes To capture the arbitrary edge directions presented in natural video, the number of directional intra modes in VVC is extended from 33, as used in HEVC, to 65. The new directional modes not in HEVC are depicted as red dotted arrows in FIG. 4, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.1.1.2. Intra Mode Coding

To keep the complexity of the most probable mode (MPM) list generation low, an intra mode coding method with 6 MPMs is used by considering two available neighboring intra modes. The following three aspects are considered to construct the MPM list:

Default intra modes.
Neighbouring intra modes.
Derived intra modes.

A unified 6-MPM list is used for intra blocks irrespective of whether MRL and ISP coding tools are applied or not. The MPM list is constructed based on intra modes of the left and above neighboring block. Suppose the mode of the left is denoted as Left and the mode of the above block is denoted as Above, the unified MPM list is constructed as follows:

When a neighboring block is not available, its intra mode is set to Planar by default.

If both modes Left and Above are non-angular modes:
MPM list→{Planar, DC, V, H, V−4, V+4}.

If one of modes Left and Above is angular mode, and the other is non-angular:
Set a mode Max as the larger mode in Left and Above
MPM list→{Planar, Max, DC, Max−1, Max+1, Max−2}.

If Left and Above are both angular and they are different:
Set a mode Max as the larger mode in Left and Above.
if the difference of mode Left and Above is in the range of 2 to 62, inclusive
MPM list→{Planar, Left, Above, DC, Max−1, Max+1}.
Otherwise
MPM list→{Planar, Left, Above, DC, Max−2, Max+2}.

If Left and Above are both angular and they are the same:
MPM list→{Planar, Left, Left−1, Left+1, DC, Left−2}.

Besides, the first bin of the mpm index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

2.1.1.3. Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 5:
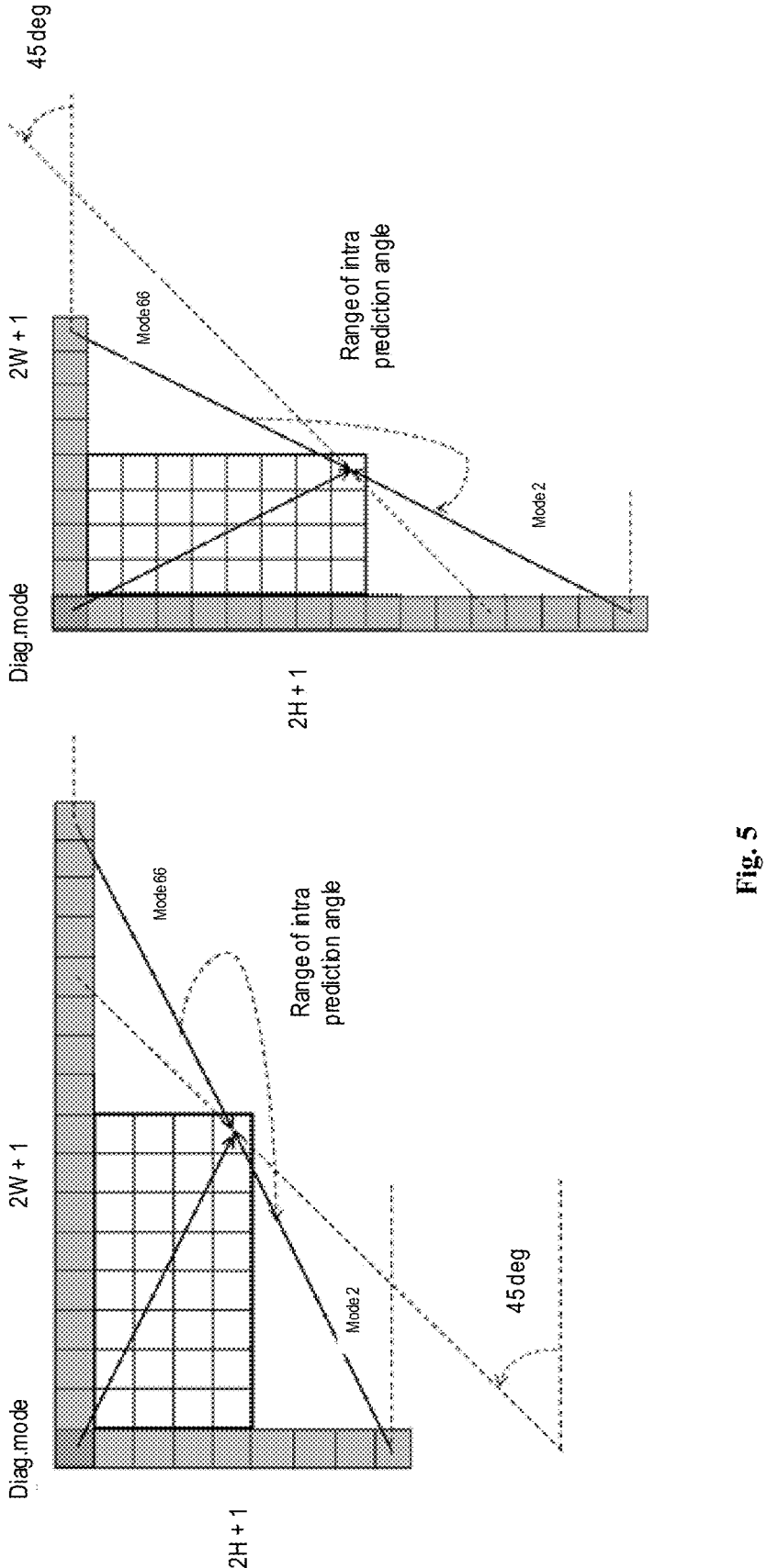
FIG. 5 illustrates a block diagram of reference samples for wide-angular intra prediction.

To support these prediction directions, the top reference with length 2W+1, and the left reference with length 2H+1, are defined as shown in FIG. 5.

The number of replaced modes in wide-angular direction mode depends on the aspect ratio of a block. The replaced intra prediction modes are illustrated in Table 1.

TABLE 1

| Intra prediction modes replaced by wide-angular modes | |
| --- | --- |
| Aspect ratio | Replaced intra prediction modes |
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |

TABLE 1-continued

| Intra prediction modes replaced by wide-angular modes | |
|---|---|
| Aspect ratio | Replaced intra prediction modes |
| W/H = ⅛ | Modes 55, 56 |
| W/H = ¹⁄₁₆ | Modes 53, 54, 55, 56 |

Figure 6:
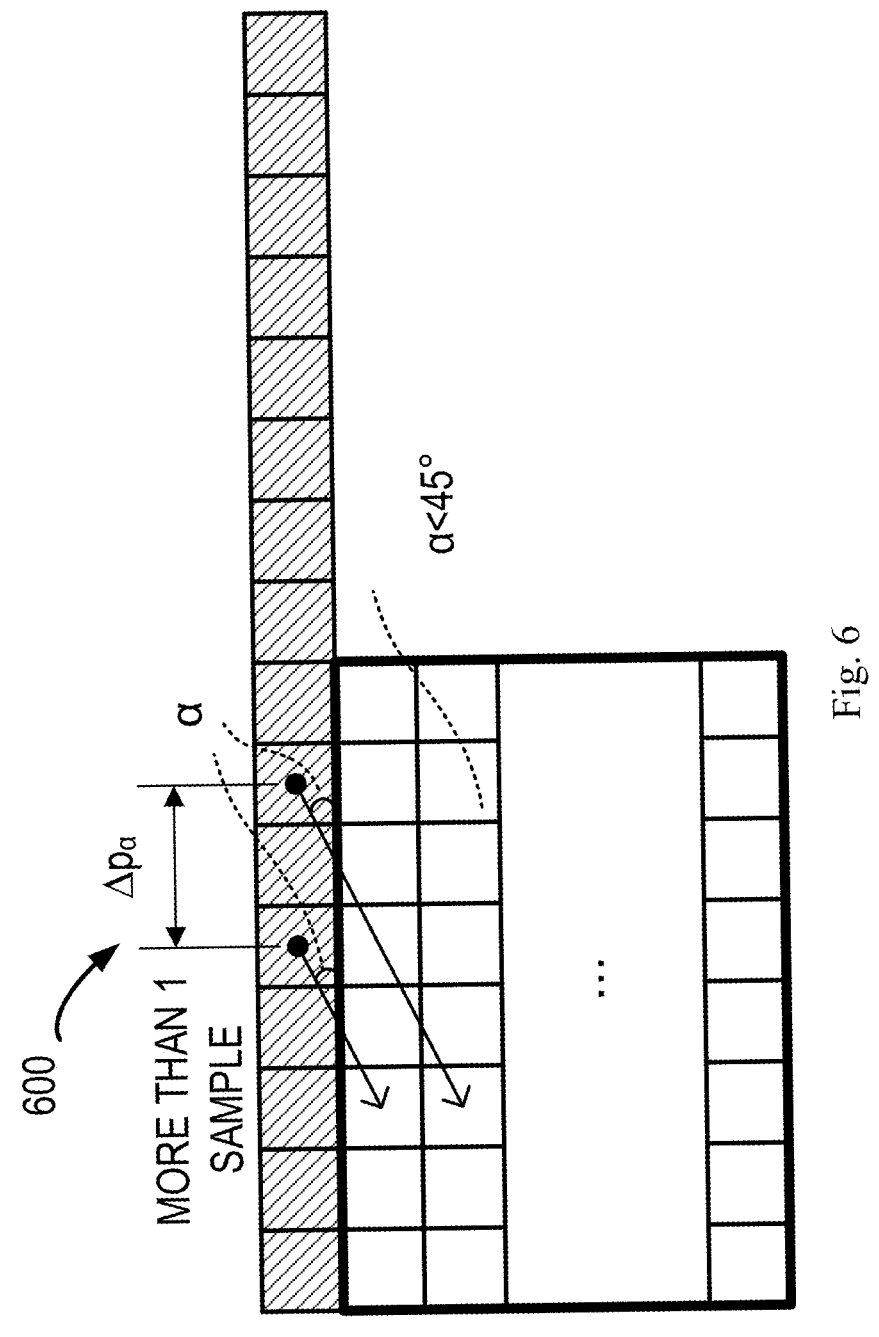
FIG. 6 illustrates a schematic diagram of problem of discontinuity in case of directions beyond 45°.

FIG. 6 illustrates a block diagram of discontinuity in case of directions beyond 45 degree. As shown in the diagram 600 of FIG. 6, two vertically adjacent predicted samples may use two non-adjacent reference samples in the case of wide-angle intra prediction Hence, low-pass reference samples filter and side smoothing are applied to the wide-angle prediction to reduce the negative effect of the increased gap $\Delta p_\alpha$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135 degree and above 45 degree, luma intra prediction modes ranging from 2 to 5 are mapped to 2. Therefore chroma DM derivation table for 4:2:2: chroma format is updated by replacing some values of the entries of the mapping table to convert prediction angle more precisely for chroma blocks.

2.1.1.4. Mode Dependent Intra Smoothing (MDIS)

Four-tap intra interpolation filters are utilized to improve the directional intra prediction accuracy. In HEVC, a two-tap linear interpolation filter has been used to generate the intra prediction block in the directional prediction modes (i.e., excluding Planar and DC predictors). In VVC, simplified 6-bit 4-tap Gaussian interpolation filter is used for only directional intra modes. Non-directional intra prediction process is unmodified. The selection of the 4-tap filters is performed according to the MDIS condition for directional intra prediction modes that provide non-fractional displacements, i.e. to all the directional modes excluding the following: 2, HOR_IDX, DIA_IDX, VER_IDX, 66.

Depending on the intra prediction mode, the following reference samples processing is performed:

The directional intra-prediction mode is classified into one of the following groups:
vertical or horizontal modes (HOR_IDX, VER_IDX), diagonal modes that represent angles which are multiple of 45 degree (2, DIA_IDX, VDIA_IDX), remaining directional modes;

If the directional intra-prediction mode is classified as belonging to group A, then then no filters are applied to reference samples to generate predicted samples;

Otherwise, if a mode falls into group B, then a [1, 2, 1] reference sample filter may be applied (depending on the MDIS condition) to reference samples to further copy these filtered values into an intra predictor according to the selected direction, but no interpolation filters are applied;

Otherwise, if a mode is classified as belonging to group C, then only an intra reference sample interpolation filter is applied to reference samples to generate a predicted sample that falls into a fractional or integer position between reference samples according to a selected direction (no reference sample filtering is performed).

2.1.1.5. Position Dependent Intra Prediction Combination

In VVC, the results of intra prediction of DC, planar and several angular modes are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes. The prediction sample pred(x',y') is predicted using an intra prediction mode (DC, planar, angular) and a linear combination of reference samples according to the Equation 3-8 as follows:

$$pred(x', y') = \left(wL \times R_{-1,y'} + wT \times R_{x',-1} - \right. \qquad (2-1)$$
$$\left. wTL \times R_{-1,-1} + (64 - wL - wT + wTL) \times pred(x', y') + 32 \right) \gg 6$$

where $R_{x,-1}$, $R_{-1,y}$ represent the reference samples located at the top and left boundaries of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters. PDPC process for DC and Planar modes is identical and clipping operation is avoided. For angular modes, pdpc scale factor is adjusted such that range check is not needed and condition on angle to enable pdpc is removed (scale>=0 is used). In addition, PDPC weight is based on 32 in all angular mode cases. The PDPC weights are dependent on prediction modes and are shown in Table 2. PDPC is applied to the block with both width and height greater than or equal to 4.

Figure 7:
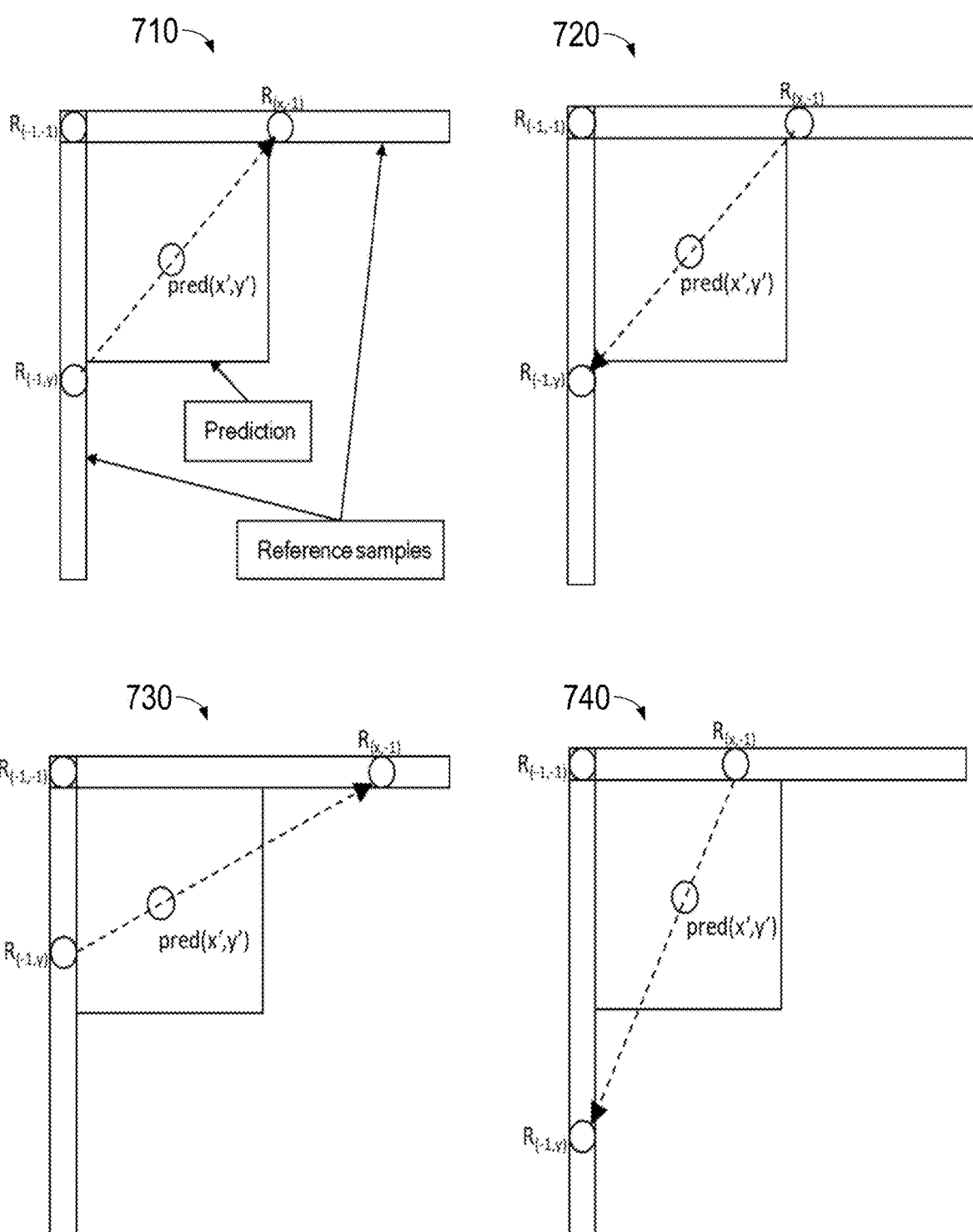
FIG. 7 illustrates a schematic diagram of definition of samples used by PDPC applied to diagonal and adjacent angular intra modes.

FIG. 7 illustrates the definition of reference samples ($R_{x,-1}$, $R_{-1,y}$ and $R_{-1,-1}$) for PDPC applied over various prediction modes. FIG. 7 shows a diagonal top-right mode 710, a diagonal bottom-left mode 720, an adjacent diagonal top-right mode 730 and an adjacent diagonal bottom-left mode 740. The prediction sample pred(x', y') is located at (x', y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other annular mode, the reference samples $R_{x,-1}$ and $R_{-1,y}$ could be located in fractional sample position. In this case, the sample value of the nearest integer sample location is used.

TABLE 2

| Example of PDPC weights according to prediction modes | | | |
|---|---|---|---|
| Prediction modes | wT | wL | wTL |
| Diagonal top-right | 16 >> ((y' << 1) >> shift) | 16 >> ((x' << 1) >> shift) | 0 |

TABLE 2-continued

Example of PDPC weights according to prediction modes

| Prediction modes | wT | wL | wTL |
|---|---|---|---|
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((x' << 1) >> shift) | 0 |

2.1.1.6. Multiple Reference Line (MRL) Intra Prediction

Figure 8:
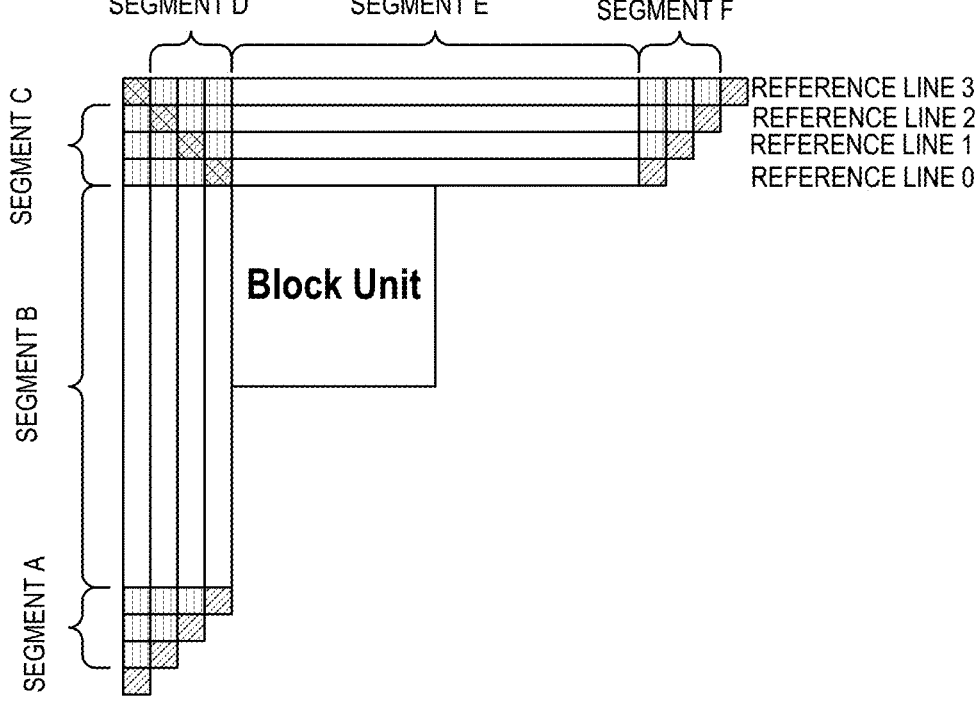
FIG. 8 illustrates a schematic diagram of example of four reference lines neighboring to a prediction block.

Multiple reference line (MRL) intra prediction uses more reference lines for intra prediction. In FIG. 8, an example of 4 reference lines is depicted, where the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signalled and used to generate intra predictor. For reference line idx, which is greater than 0, only include additional reference line modes in MPM list and only signal mpm index without remaining mode. The reference line index is signalled before intra prediction modes, and Planar mode is excluded from intra prediction modes in case a nonzero reference line index is signalled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices is aligned with that of reference line index 0. MRL requires the storage of 3 neighboring luma reference lines with a CTU to generate predictions. The Cross-Component Linear Model (CCLM) tool also requires 3 neighboring luma reference lines for its downsampling filters. The definition of MLR to use the same 3 lines is aligned as CCLM to reduce the storage requirements for decoders.

2.1.1.7. Intra sub-partitions (ISP)

The intra sub-partitions (ISP) divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. It has been noted that the M×128 (with M≤64) and 128×N (with N≤64) ISP blocks could generate a potential issue with the 64×64 VDPU. For example, an M×128 CU in the single tree case has an M×128 luma TB and two corresponding $$\frac{M}{2} \times 64$$

chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 128×N CU using ISP.

Figure 9:
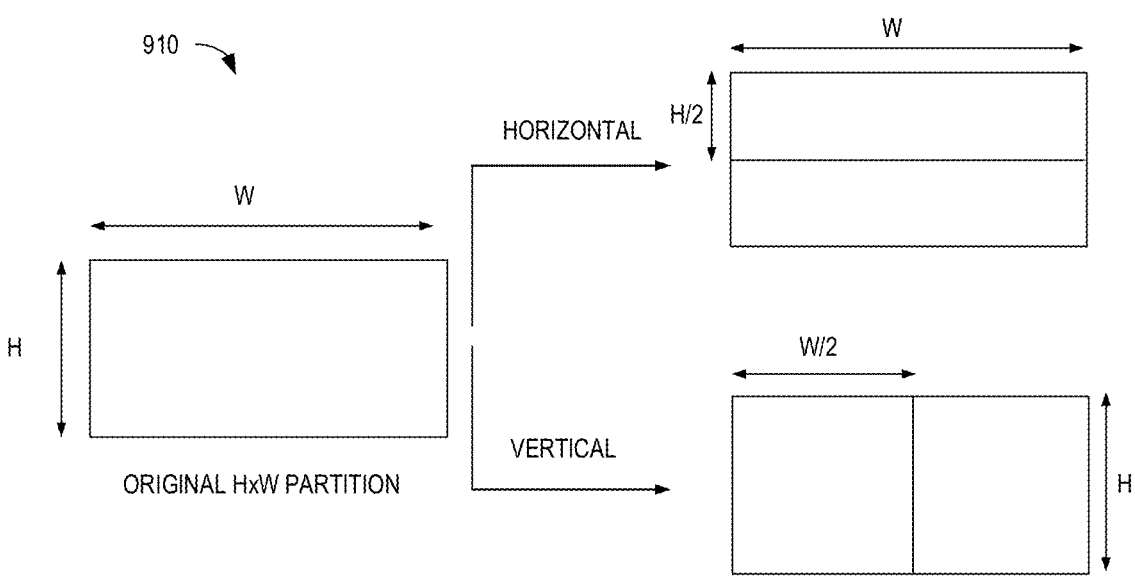
FIG. 9 illustrates a schematic diagram of sub-partition depending on the block size.
Figure 9:
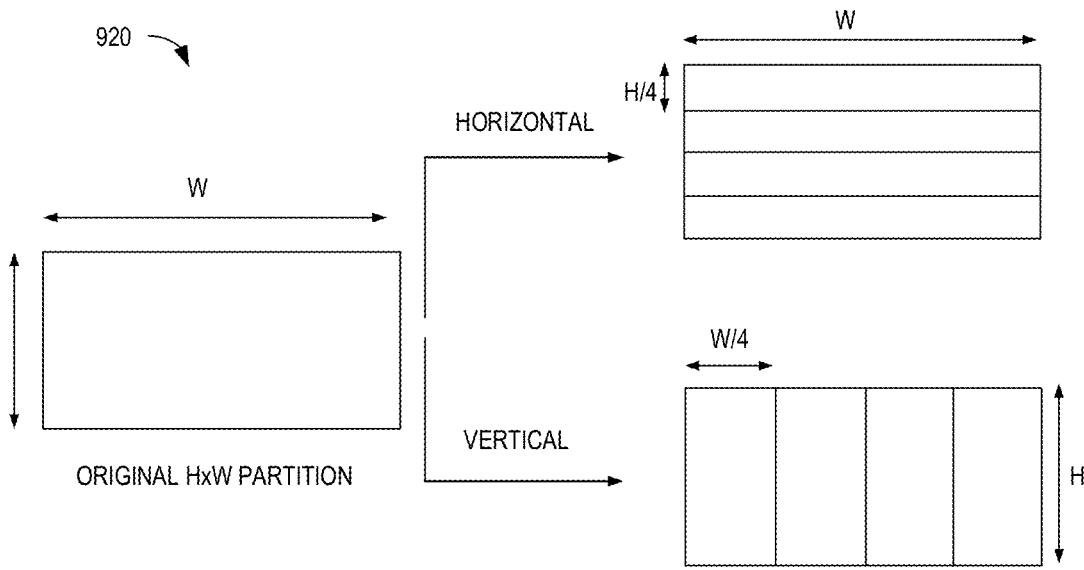

Hence, these two cases are an issue for the 64×64 decoder pipeline. For this reason, the CU sizes that can use ISP is restricted to a maximum of 64×64. FIG. 9 shows examples of the two possibilities. All sub-partitions fulfill the condition of having at least 16 samples. FIG. 9 shows an example 910 of sub-partitions for 4×8 and 8×4 CUs and an example 920 of sub-partitions for CUs other than 4×8, 8×4 and 4×4. In ISP, the dependence of 1×N/2×N subblock prediction on the reconstructed values of previously decoded 1×N/2×N subblocks of the coding block is not allowed so that the minimum width of prediction for subblocks becomes four samples. For example, an 8×N (N>4) coding block that is coded using ISP with vertical split is split into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. Thus, there is no delay added in processing these smaller blocks than processing 4×4 regular-coded intra blocks.

TABLE 3

Entropy coding coefficient group size

| Block Size | Coefficient group Size |
|---|---|
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines.

All sub-partitions share the same intra mode. The followings are summary of interaction of ISP with other coding tools.

Multiple Reference Line (MRL): if a block has an MRL index other than 0, then the ISP coding mode will be inferred to be 0 and therefore ISP mode information will not be sent to the decoder.

Entropy coding coefficient group size: the sizes of the entropy coding subblocks have been modified so that they have 16 samples in all possible cases, as shown in Table 3. Note that the new sizes only affect blocks produced by ISP in which one of the dimensions is less than 4 samples. In all other cases coefficient groups keep the 4×4 dimensions.

CBF coding: it is assumed to have at least one of the sub-partitions has a non-zero CBF. Hence, if n is the number of sub-partitions and the first n−1 sub-partitions have produced a zero CBF, then the CBF of the n-th sub-partition is inferred to be 1.

MPM usage: the MPM flag will be inferred to be one in a block coded by ISP mode, and the MPM list is modified to exclude the DC mode and to prioritize horizontal intra modes for the ISP horizontal split and vertical intra modes for the vertical one.

Transform size restriction: all ISP transforms with a length larger than 16 points uses the DCT-II.

PDPC: when a CU uses the ISP coding mode, the PDPC filters will not be applied to the resulting sub-partitions.

MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signalling is required. For example, let $t_H$ and $t_V$ be the horizontal and the vertical transforms selected respectively for the w×h sub-partition, where w is the width and h is the height. Then the transform is selected according to the following rules:

If w=1 or h=1, then there is no horizontal or vertical transform respectively.

If w=2 or w>32, $t_H$=DCT-II

If h=2 or h>32, $t_V$=DCT-II

Otherwise, the transform is selected as in Table 4.

TABLE 4

| Transform selection depends on intra mode | | |
|---|---|---|
| Intra mode | $t_H$ | $t_V$ |
| Planar | DST-VII | DST-VII |
| Ang. 31, 32, 34, 36, 37 | | |
| DC | DCT-II | DCT-II |
| Ang. 33, 35 | | |
| Ang. 2, 4, 6 . . . 28, 30 | DST-VII | DCT-II |
| Ang. 39, 41, 43 . . . 63, 65 | | |
| Ang. 3, 5, 7 . . . 27, 29 | DCT-II | DST-VII |
| Ang. 38, 40, 42 . . . 64, 66 | | |

In ISP mode, all 67 intra modes are allowed. PDPC is also applied if corresponding width and height is at least 4 samples long. In addition, the condition for intra interpolation filter selection doesn't exist anymore, and Cubic (DCT-IF) filter is always applied for fractional position interpolation in ISP mode.

2.1.1.8. Matrix Weighted Intra Prediction (MIP)

Figure 10:
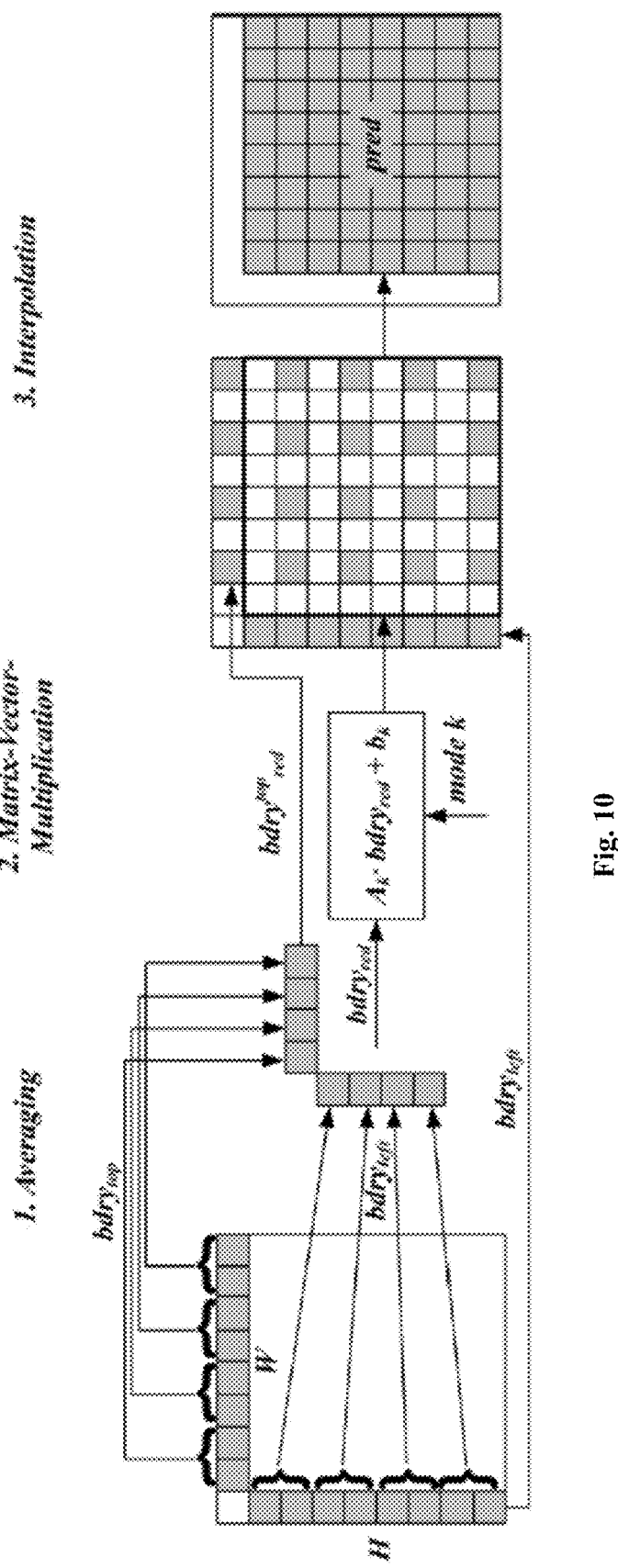
FIG. 10 illustrates matrix weighted intra prediction process.

Matrix weighted intra prediction (MIP) method is a newly added intra prediction technique into VVC. For predicting the samples of a rectangular block of width W and height H, matrix weighted intra prediction (MIP) takes one line of H reconstructed neighbouring boundary samples left of the block and one line of W reconstructed neighbouring boundary samples above the block as input. If the reconstructed samples are unavailable, they are generated as it is done in the conventional intra prediction. The generation of the prediction signal is based on the following three steps, which are averaging, matrix vector multiplication and linear interpolation as shown in FIG. 10.

2.1.1.9 Averaging Neighboring Samples

Among the boundary samples, four samples or eight samples are selected by averaging based on block size and shape. Specifically, the input boundaries $bdry^{top}$ and $bdry^{left}$ are reduced to smaller boundaries $$bdry_{red}^{top} \text{ and } bdry_{red}^{left}$$

by averaging neighboring boundary samples according to predefined rule depends on block size. Then, the two reduced boundaries $$bdry_{red}^{top} \text{ and } bdry_{red}^{left}$$

are concatenated to a reduced boundary vector $bdry_{red}$ which is thus of size four for blocks of shape 4×4 and of size eight for blocks of all other shapes. If mode refers to the MIP-mode, this concatenation is defined as follows:

$$bdry_{red} = \begin{cases} \left[bdry_{red}^{top}, bdry_{red}^{left}\right] & \text{for } W = H = 4 \text{ and } \text{mode} < 18 & (2\text{-}2) \\ \left[bdry_{red}^{left}, bdry_{red}^{top}\right] & \text{for } W = H = 4 \text{ and } \text{mode} \geq 18 \\ \left[bdry_{red}^{top}, bdry_{red}^{left}\right] & \text{for } \max(W, H) = 8 \text{ and } \text{mode} < 10 \\ \left[bdry_{red}^{left}, bdry_{red}^{top}\right] & \text{for } \max(W, H) = 8 \text{ and } \text{mode} \geq 10 \\ \left[bdry_{red}^{top}, bdry_{red}^{left}\right] & \text{for } \max(W, H) > 8 \text{ and } \text{mode} < 6 \\ \left[bdry_{red}^{left}, bdry_{red}^{top}\right] & \text{for } \max(W, H) > 8 \text{ and } \text{mode} \geq 6. \end{cases}$$

2.1.1.10 Matrix Multiplication

A matrix vector multiplication, followed by addition of an offset, is carried out with the averaged samples as an input. The result is a reduced prediction signal on a subsampled set of samples in the original block. Out of the reduced input vector $bdry_{red}$ a reduced prediction signal $pred_{red}$, which is a signal on the downsampled block of width $W_{red}$ and height $H_{red}$ is generated. Here, $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases} \quad (2\text{-}3)$$

$$H_{red} = \begin{cases} 4 & \text{for } \max(W, H) \leq 8 \\ \min(H, 8) & \text{for } \max(W, H) > 8 \end{cases} \quad (2\text{-}4)$$

The reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$. The matrix A and the offset vector b are taken from one of the sets $S_0$, $S_1$, $S_2$. One defines an index idx=idx(W, H) as follows:

$$idx(W, H) = \begin{cases} 0 & \text{for } W = H = 4 \\ 1 & \text{for } \max(W, H) = 8 \\ 2 & \text{for } \max(W, H) > 8. \end{cases} \quad (2\text{-}5)$$

Here, each coefficient of the matrix A is represented with 8 bit precision. The set $S_0$ consists of 16 matrices $$A_0^i,$$

$i \in \{0, \ldots, 15\}$ each of which has 16 rows and 4 columns and 16 offset vectors $$b_0^i,$$

$i \in \{0, \ldots, 16\}$ each of size 16. Matrices and offset vectors of that set are used for blocks of size 4×4. The set $S_1$ consists of 8 matrices $$A_1^i,$$

$i \in \{0, \ldots, 7\}$, each of which has 16 rows and 8 columns and 8 offset vectors $$b_1^i,$$

$i \in \{0, \ldots, 7\}$ each of size 16. The set $S_2$ consists of 6 matrices $$A_2^i,$$

$i \in \{0, \ldots, 5\}$, each of which has 64 rows and 8 columns and of 6 offset vectors $$b_2^i,$$

$i \in \{0, \ldots, 5\}$ of size 64.

2.1.1.11 Interpolation

The prediction signal at the remaining positions is generated from the prediction signal on the subsampled set by linear interpolation which is a single step linear interpolation in each direction. The interpolation is performed firstly in the horizontal direction and then in the vertical direction regardless of block shape or block size.

2.1.1.12 Signaling of MIP Mode and Harmonization with Other Coding Tools

For each Coding Unit (CU) in intra mode, a flag indicating whether an MIP mode is to be applied or not is sent. If an MIP mode is to be applied, MIP mode (predModeIntra) is signaled. For an MIP mode, a transposed flag (isTransposed), which determines whether the mode is transposed, and MIP mode Id (modeId), which determines which matrix is to be used for the given MIP mode is derived as follows $$isTransposed = predModeIntra \,\&\, 1$$
$$modeId = predModeIntra \gg 1. \tag{2-6}$$

MIP coding mode is harmonized with other coding tools by considering following aspects:

LFNST is enabled for MIP on large blocks. Here, the LFNST transforms of planar mode are used;

The reference sample derivation for MIP is performed exactly as for the conventional intra prediction modes;

For the upsampling step used in the MIP-prediction, original reference samples are used instead of down-sampled ones;

Clipping is performed before upsampling and not after upsampling;

MIP is allowed up to 64×64 regardless of the maximum transform size;

The number of MIP modes is 32 for sizeId=0, 16 for sizeId=1 and 12 for sizeId=2.

2.1.2. Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

Extended merge prediction;

Merge mode with MVD (MMVD);

Symmetric MVD (SMVD) signalling;

Affine motion compensated prediction;

Subblock-based temporal motion vector prediction (SbTMVP);

Adaptive motion vector resolution (AMVR);

Motion field storage: $\frac{1}{16}^{th}$ luma sample MV storage and 8×8 motion field compression;

Bi-prediction with CU-level weight (BCW);

Bi-directional optical flow (BDOF);

Decoder side motion vector refinement (DMVR);

Geometric partitioning mode (GPM);

Combined inter and intra prediction (CIIP).

The following text provides the details on those inter prediction methods specified in VVC.

2.1.2.1. Extended Merge Prediction

In VVC, the merge candidate list is constructed by including the following five types of candidates in order:

1) Spatial MVP from spatial neighbour CUs;

2) Temporal MVP from collocated CUs;

3) History-based MVP from an FIFO table;

4) Pairwise average MVP;

5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.1.2.2. Spatial Candidates Derivation

Figure 11:
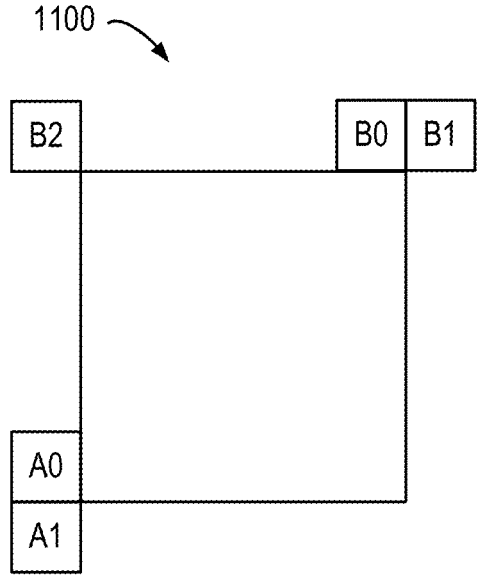
FIG. 11 illustrates positions of spatial merge candidate.
Figure 12:
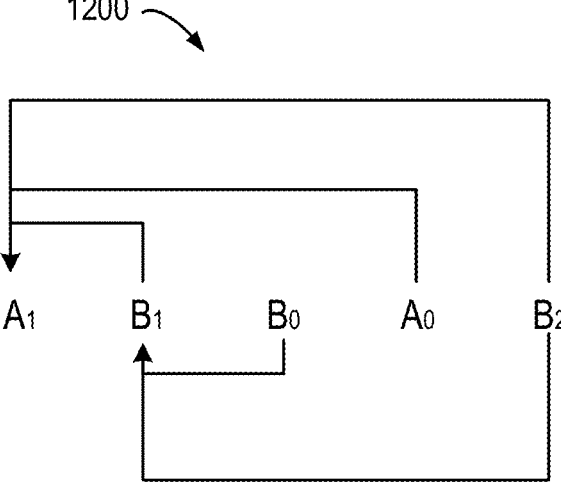
FIG. 12 illustrates candidate pairs considered for redundancy check of spatial merge candidates.

The derivation of spatial merge candidates in VVC is same to that in HEVC except the positions of first two merge candidates are swapped. FIG. 11 is a schematic diagram 1100 illustrating positions of a spatial merge candidate. A maximum of four merge candidates are selected among candidates located in the positions depicted in FIG. 11. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. FIG. 12 is a schematic diagram 1200 illustrating candidate pairs considered for redundancy check of spatial merge candidates. Instead only the pairs linked with an arrow in FIG. 12 are considered and a candidate is only added to the list if the corresponding candidate used for redundancy check has not the same motion information.

2.1.2.3. Temporal Candidates Derivation

Figure 13:
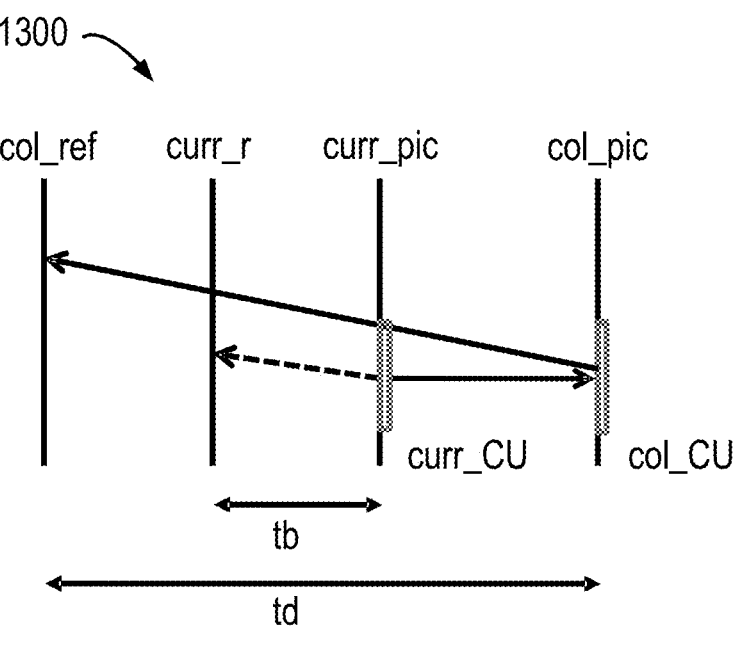
FIG. 13 illustrates an illustration of motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in the diagram 1300 of FIG. 13, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 14:
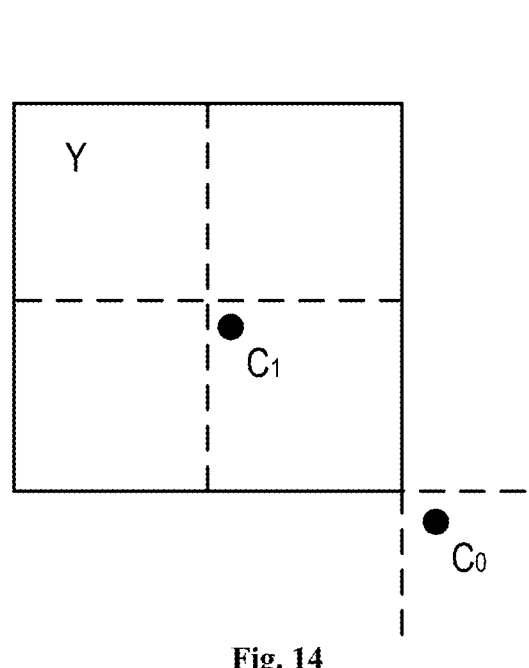
FIG. 14 illustrates candidate positions for temporal merge candidate, C0 and C1.

FIG. 14 is a schematic diagram 1400 illustrating candidate positions for temporal merge candidate, $C_0$ and $C_1$. The position for the temporal candidate is selected between candidates C0 and C1, as depicted in FIG. 14. If CU at position C0 is not available, is intra coded, or is outside of the current row of CTUs, position C1 is used. Otherwise, position C0 is used in the derivation of the temporal merge candidate.

2.1.2.4. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate. The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4)?M: (8−N), wherein N indicates number of existing candidates in the merge list and M indicates number of available HMVP candidates in the table.

2. Once the total number of available merge candidates reaches the maximally allowed merge candidates minus 1, the merge candidate list construction process from HMVP is terminated.

2.1.2.5. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.1.2.6. Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel) and where (xCb, yCb) is the top-left luma sample position of the current CU in the picture and (cbWidth, cbHeight) is the CU size. The MER size is selected at encoder side and signalled as log 2_parallel_merge_level_minus2 in the sequence parameter set.

2.1.3. Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signalled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

Figure 15:
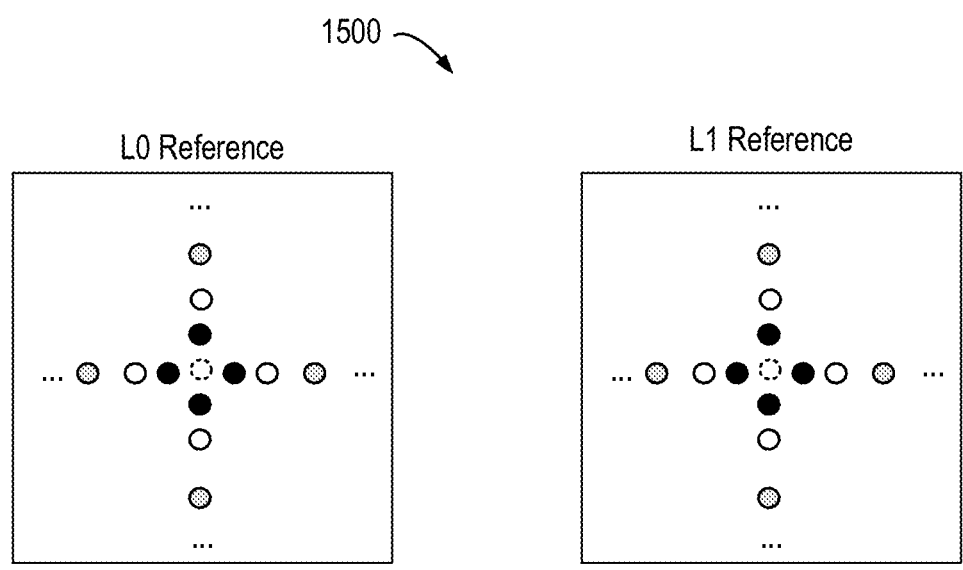
FIG. 15 illustrates a schematic diagram of MMVD search point.

Distance index specifies motion magnitude information and indicate the pre-defined offset from the starting point. FIG. 15 is a schematic diagram 1500 illustrating a merge mode with motion vector differences (MMVD) search point. As shown in FIG. 15, an offset is added to either horizontal component or vertical component of starting MV. The relation of distance index and pre-defined offset is specified in Table 5.

TABLE 5

The relation of distance index and pre-defined offset

| | Distance IDX | | | | | | | |
| --- | --- | --- | --- | --- | --- | --- | --- | --- |
| | 0 | 1 | 2 | 3 | 4 | 5 | 6 | 7 |
| Offset (in unit of luma sample) | $\frac{1}{4}$ | $\frac{1}{2}$ | 1 | 2 | 4 | 8 | 16 | 32 |

Direction index represents the direction of the MVD relative to the starting point. The direction index can represent of the four directions as shown in Table 6. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 6 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 6 specifies the sign of MV offset added to the list0 MV component of starting MV and the sign for the list1 MV has opposite value.

TABLE 6

Sign of MV offset specified by direction index

| Direction IDX | 00 | 01 | 10 | 11 |
| --- | --- | --- | --- | --- |
| x-axis | + | − | N/A | N/A |
| y-axis | N/A | N/A | + | − |

2.1.3.1. Bi-prediction with CU-level weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred} = ((8 - w) * P_0 + w * P_1 + 4) >> 3. \qquad (2\text{-}7)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture. When combined with affine, affine ME will be performed for unequal weights if and only if the affine mode is selected as the current best mode. When the two reference pictures in bi-prediction are the same, unequal weights are only conditionally checked. Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used. Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

2.1.3.2. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order.

The distances (i.e. POC difference) from two reference pictures to the current picture are same.

Both reference pictures are short-term reference pictures.

The CU is not coded using affine mode or the ATMVP merge mode.

CU has more than 64 luma samples.

Both CU height and CU width are larger than or equal to 8 luma samples.

BCW weight index indicates equal weight.

WP is not enabled for the current CU.

CIIP mode is not used for the current CU.

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals are computed by directly calculating the difference between two neighboring samples, i.e., $$\frac{\partial I^{(k)}}{\partial x}(i, j) = \left( \left( I^{(k)}(i+1, j) \gg \text{shift1} \right) - \left( I^{(k)}(i-1, j) \gg \text{shift1} \right) \right) \quad (2\text{-}8)$$

$$\frac{\partial I^{(k)}}{\partial y}(i, j) = \left( \left( I^{(k)}(i+1, j) \gg \text{shift1} \right) - \left( I^{(k)}(i-1, j) \gg \text{shift1} \right) \right)$$

where $I^{(k)}(i, j)$ are the sample value at coordinate $(i, j)$ of the prediction signal in list k, k=0,1, and shift1 is calculated based on the luma bit depth, bitDepth, as shift1=max(6, bitDepth-6).

Then, the auto- and cross-correlation of the gradients, $S_1$, $S_2$, $S_3$, $S_5$ and $S_6$, are calculated as $$S_1 = \sum_{(i,j)\in\Omega} \text{Abs}(\psi_x(i, j)), \quad S_3 = \sum_{(i,j)\in\Omega} \theta(i, j) \cdot \text{Sign}(\psi_x(i, j)) \quad (2\text{-}9)$$

$$S_2 = \sum_{(i,j)\in\Omega} \psi_x(i, j) \cdot \text{Sign}(\psi_y(i, j))$$

$$S_5 = \sum_{(i,j)\in\Omega} \text{Abs}(\psi_y(i, j)), \quad S_6 = \sum_{(i,j)\in\Omega} \theta(i, j) \cdot \text{Sign}(\psi_y(i, j))$$

where $$\psi_x(i, j) = \left( \frac{\partial I^{(1)}}{\partial x}(i, j) + \frac{\partial I^{(0)}}{\partial x}(i, j) \right) \gg n_a \quad (2\text{-}10)$$

$$\psi_y(i, j) = \left( \frac{\partial I^{(1)}}{\partial y}(i, j) + \frac{\partial I^{(0)}}{\partial y}(i, j) \right) \gg n_a$$

$$\theta(i, j) = \left( I^{(1)}(i, j) \gg n_b \right) - \left( I^{(0)}(i, j) \gg n_b \right)$$

where $\Omega$ is a 6×6 window around the 4×4 subblock, and the values of $n_a$ and $n_b$ are set equal to min (1, bitDepth−11) and min(4, bitDepth−8), respectively.

The motion refinement $(v_x, v_y)$ is then derived using the cross- and auto-correlation terms using the following:

$$v_x = S_1 > 0? \text{ clip } 3\left(-th'_{BIO}, th'_{BIO}, -\left((S_3 \cdot 2^{n_b-n_a}) \gg \lfloor\log_2 S_1\rfloor\right)\right): 0 \quad (2\text{-}11)$$

$$v_y = S_5 > 0? \text{ clip } 3\left(-th'_{BIO}, th'_{BIO}, -\left((S_6 \cdot 2^{n_b-n_a} - \right.\right.$$

-continued $$\left. \left. (v_x S_{2,m}) \ll n_{S_2} + v_x S_{2,s})/2 \right) \gg \lfloor\log_2 S_5\rfloor\right)\right): 0$$

where $S_{2,m} = S_2 \gg n_{S_2}$, $S_{2,s} = S_2 \& (2^{n_{S_2}} - 1)$, $th'_{BIO} = 2^{max(5, BD-7)}$.

$\lfloor \bullet \rfloor$ is the floor function, and $n_{S_2}=12$.

Based on the motion refinement and the gradients, the following adjustment is calculated for each sample in the 4×4 subblock:

$$b(x, y) = rnd\left( \left( v_x \left( \frac{\partial I^{(1)}(x, y)}{\partial x} - \frac{\partial I^{(0)}(x, y)}{\partial x} \right) + \right.\right. \quad (2\text{-}12)$$

$$\left.\left. v_y \left( \frac{\partial I^{(1)}(x, y)}{\partial y} - \frac{\partial I^{(0)}(x, y)}{\partial y} \right) + 1 \right)/2 \right)$$

Finally, the BDOF samples of the CU are calculated by adjusting the bi-prediction samples as follows:

$$pred_{BDOF}(x, y) = \left( I^{(0)}(x, y) + I^{(1)}(x, y) + b(x, y) + o_{offset} \right) \gg \text{shift} \quad (2\text{-}13)$$

These values are selected such that the multipliers in the BDOF process do not exceed 15-bit, and the maximum bit-width of the intermediate parameters in the BDOF process is kept within 32-bit.

Figure 16:
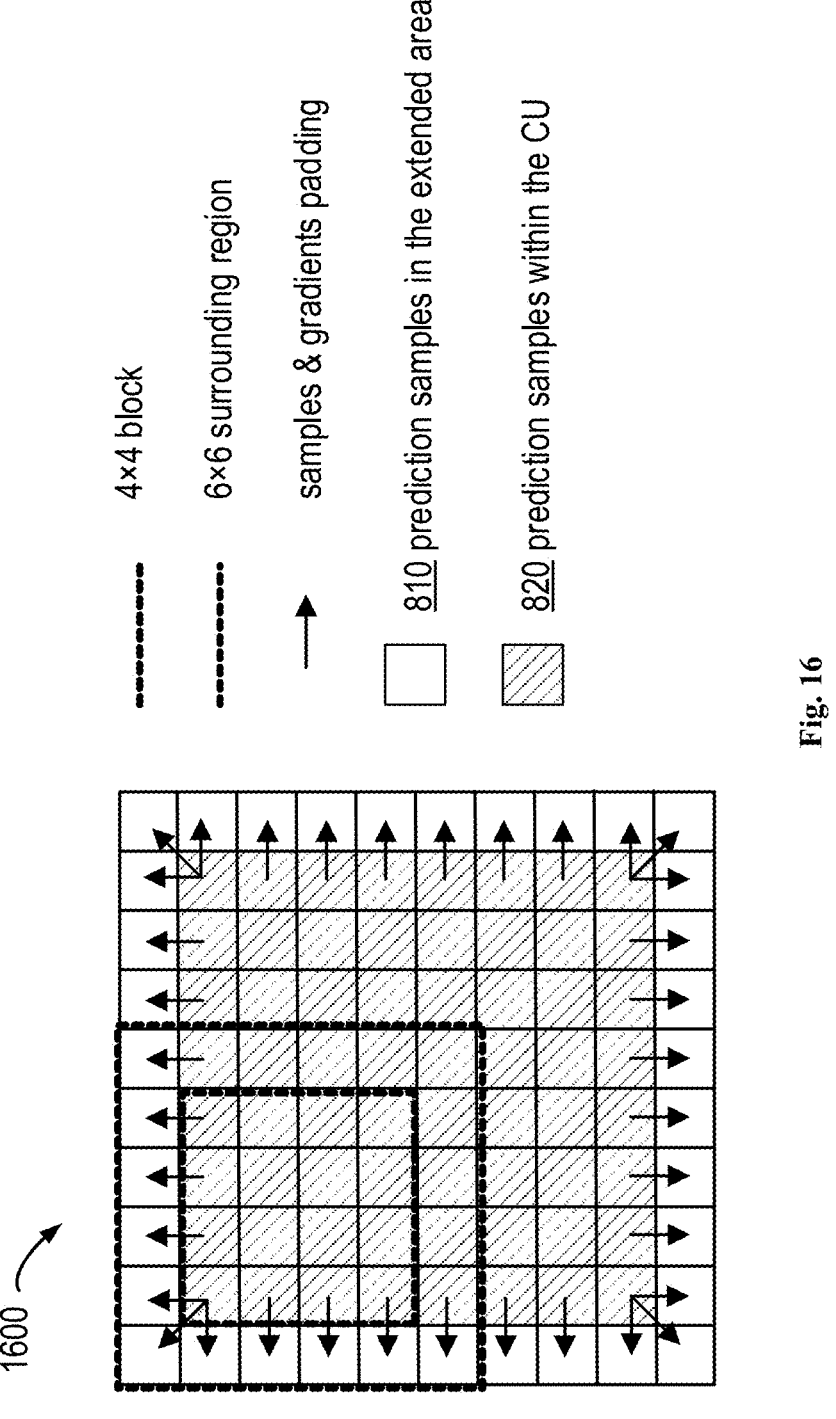
FIG. 16 illustrates extended CU region used in BDOF.

In order to derive the gradient values, some prediction samples $I^{(k)}(i, j)$ in list k (k=0,1) outside of the current CU boundaries need to be generated. FIG. 16 illustrates a schematic diagram of extended CU region used in BDOF. As depicted in the diagram 1600 of FIG. 16, the BDOF in VVC uses one extended row/column around the CU's boundaries. In order to control the computational complexity of generating the out-of-boundary prediction samples, prediction samples in the extended area (denoted as 1610 in FIG. 16) are generated by taking the reference samples at the nearby integer positions (using floor( ) operation on the coordinates) directly without interpolation, and the normal 8-tap motion compensation interpolation filter is used to generate prediction samples within the CU (denoted as 1620 in FIG. 16). These extended sample values are used in gradient calculation only. For the remaining steps in the BDOF process, if any sample and gradient values outside of the CU boundaries are needed, they are padded (i.e. repeated) from their nearest neighbors. When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1)), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled.

When a CU is coded with symmetric MVD mode or CIIP mode, BDOF is also disabled.

2.1.4. Symmetric MVD Coding

In VVC, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:

1) At slice level, variables BiDirPredFlag, RefIdxSymL0 and RefIdxSymL1 are derived as follows:

If mvd_11_zero_flag is 1, BiDirPredFlag is set equal to 0.

Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.

2) At CU level, a symmetrical mode flag indicating whether symmetrical mode is used or not is explicitly signaled if the CU is bi-prediction coded and BiDirPredFlag is equal to 1.

When the symmetrical mode flag is true, only mvp_10_flag, mvp_11_flag and MVD0 are explicitly signaled. The reference indices for list-0 and list-1 are set equal to the pair of reference pictures, respectively. MVD1 is set equal to (−MVD0). The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad (2\text{-}14)$$

Figure 17:
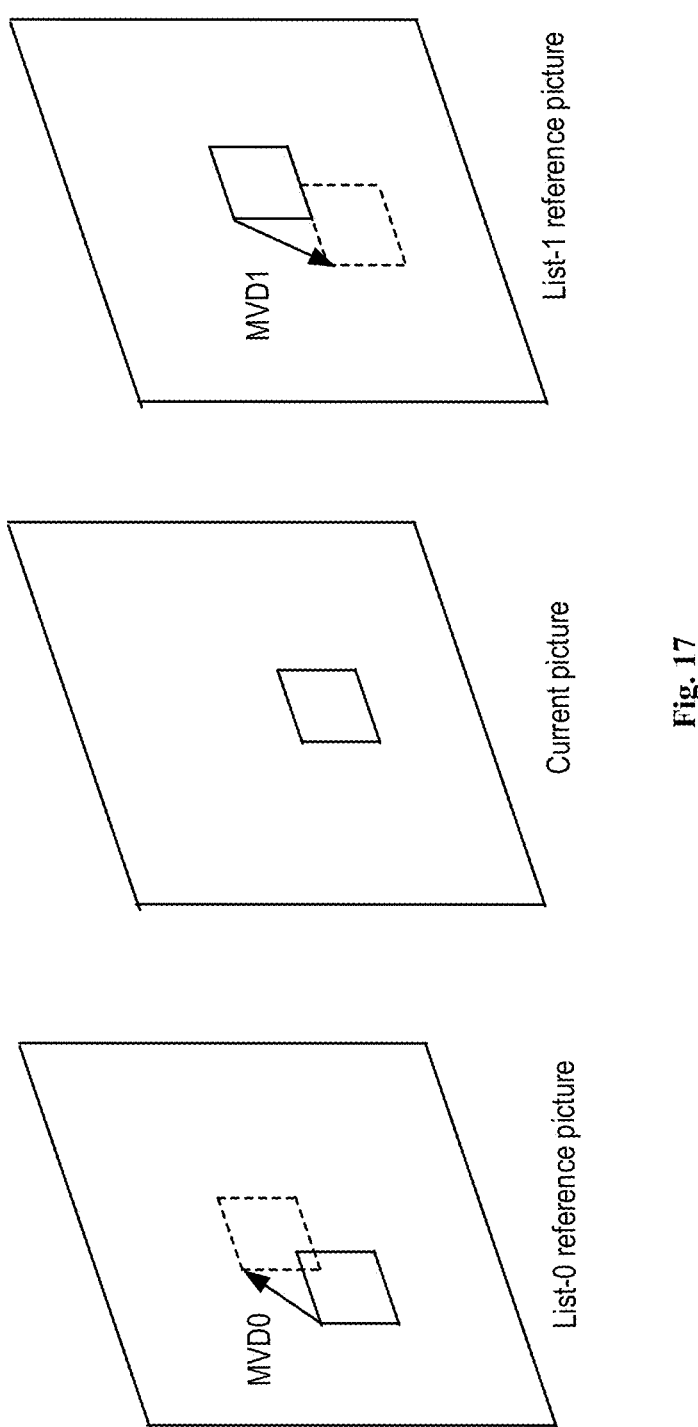
FIG. 17 illustrates an illustration for symmetrical MVD mode.

FIG. 17 is an illustration for symmetrical MVD mode. In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

2.1.5. Decoder Side Motion Vector Refinement (DMVR)

Figure 18:
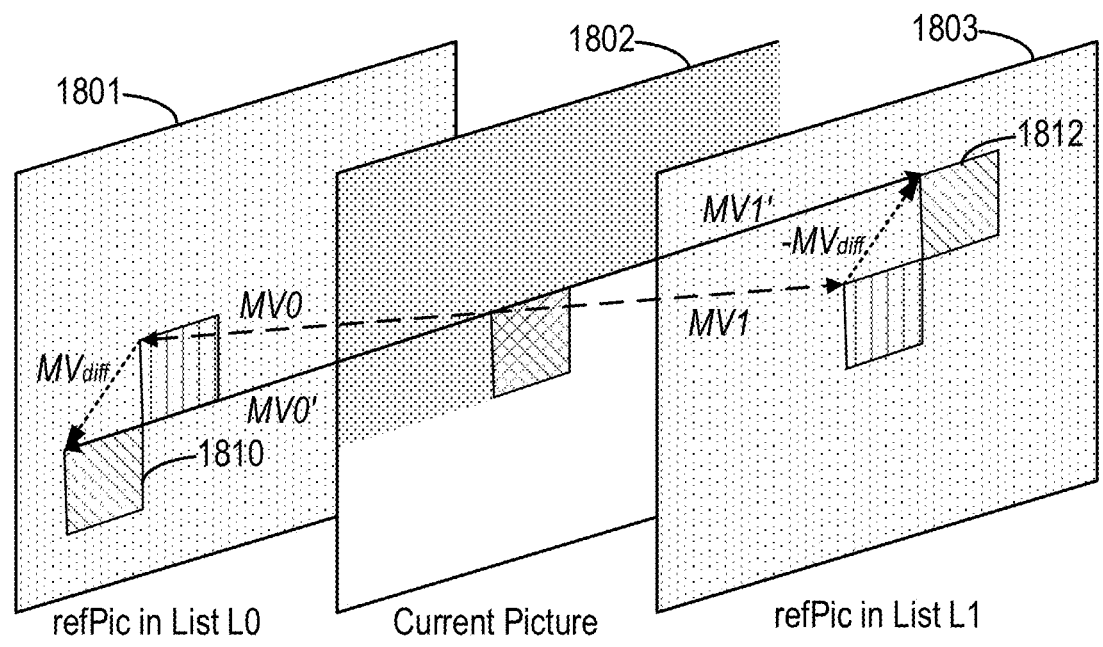
FIG. 18 illustrates decoding side motion vector refinement.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. FIG. 18 is a schematic diagram illustrating the decoding side motion vector refinement. As illustrated in FIG. 18, the SAD between the blocks 1810 and 1812 based on each MV candidate around the initial MV is calculated, where the block 1810 is in a reference picture 1801 in the list L0 and the block 1812 is in a reference picture 1803 in the List L1 for the current picture 1802. The MV candidate with the lowest SAD becomes the refined MV and used to generate the bi-predicted signal.

In VVC, the DMVR can be applied for the CUs which are coded with following modes and features:

CU level merge mode with bi-prediction MV;

One reference picture is in the past and another reference picture is in the future with respect to the current picture;

The distances (i.e. POC difference) from two reference pictures to the current picture are same;

Both reference pictures are short-term reference pictures;

CU has more than 64 luma samples;

Both CU height and CU width are larger than or equal to 8 luma samples;

BCW weight index indicates equal weight;

WP is not enabled for the current block;

CIIP mode is not used for the current block.

The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

2.1.5.1. Searching scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + MV\_offset \quad (2\text{-}15)$$

$$MV1' = MV1 - MV\_offset \quad (2\text{-}16)$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C \qquad (2\text{-}17)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0))) \qquad (2\text{-}18)$$

$$y_{min} = (E(0, -1) - E(0, 1))/(2((E(0, -1) + E(0, 1) - 2E(0, 0))). \qquad (2\text{-}19)$$

The value of $x_{min}$ and $y_{min}$ are automatically constrained to be between−8 and 8 since all cost values are positive and the smallest value is $E(0,0)$. This corresponds to half peal offset with $\frac{1}{16}$th-pel MV accuracy in VVC. The computed fractional $(x_{min}, y_{min})$ are added to the integer distance refinement MV to get the sub-pixel accurate refinement delta MV.

2.1.5.2. Bilinear-Interpolation and Sample Padding

In VVC, the resolution of the MVs is $\frac{1}{16}$ luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.1.5.3. Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

2.1.6. Combined inter and intra prediction (CIIP)

Figure 19:
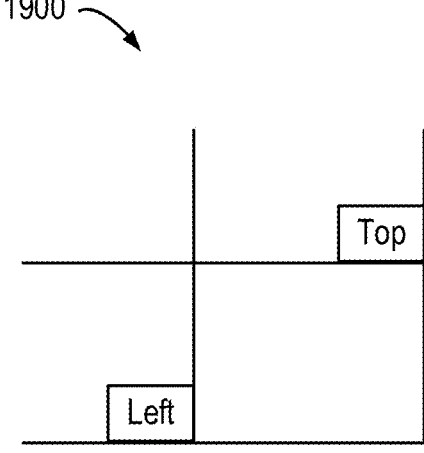
FIG. 19 illustrates top and left neighboring blocks used in CIIP weight derivation.

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in a schematic diagram 1900 in FIG. 19) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP} = ((4 - wt) * P_{inter} + wt * P_{intra} + 2) \gg 2. \qquad (2\text{-}20)$$

2.1.7. Geometric Partitioning Mode (GPM)

Figure 20:
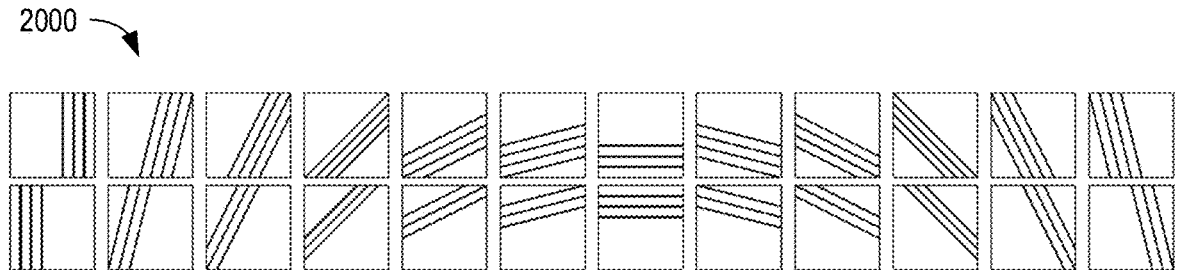
FIG. 20 illustrates examples of the GPM splits grouped by identical angles.

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 . . . 6} excluding 8×64 and 64×8. FIG. 20 shows a schematic diagram 2000 of examples of the GPM splits grouped by identical angles. When this mode is used, a CU is split into two parts by a geometrically located straight line (FIG. 20). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights. This is the prediction signal for the whole CU, and transform and quantization process will be applied to the whole CU as in other prediction modes. Finally, the motion field of a CU predicted using the geometric partition modes is stored.

2.1.7.1. Uni-Prediction Candidate List Construction

Figure 21:
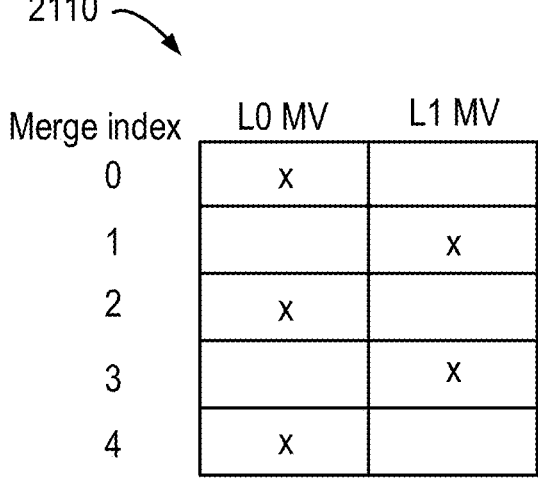
FIG. 21 illustrates uni-prediction MV selection for geometric partitioning mode.

The uni-prediction candidate list is derived directly from the merge candidate list constructed according to the extended merge prediction process. FIG. 21 is a schematic diagram illustrating the uni-prediction MV selection for geometric partitioning mode. Denote n as the index of the uni-prediction motion in the geometric uni-prediction candidate list 2110. The LX motion vector of the n-th extended merge candidate, with X equal to the parity of n, is used as the n-th uni-prediction motion vector for geometric partitioning mode. These motion vectors are marked with "x" in FIG. 21. In case a corresponding LX motion vector of the n—the extended merge candidate does not exist, the L(1−X) motion vector of the same candidate is used instead as the uni-prediction motion vector for geometric partitioning mode.

2.1.7.2. Blending along the geometric partitioning edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w) \cos(\varphi_i) + (2y + 1 - h) \sin(\varphi_i) - \rho_j \quad (2\text{-}21)$$

$$\rho_j = \rho_{x,j} \cos(\varphi_i) + \rho_{y,j} \sin(\varphi_i) \quad (2\text{-}22)$$

$$\rho_{x,j} = \begin{cases} 0 & i \ \% \ 16 = 8 \text{ or } (i \ \% \ 16 \neq 0 \text{ and } h \geq w) \\ \pm(j \times w) \gg 2 & \text{otherwise} \end{cases} \quad (2\text{-}23)$$

$$\rho_{y,j} = \begin{cases} \pm(j \times w) \gg 2 & i \ \% \ 16 = 8 \text{ or } (i \ \% \ 16 \neq 0 \text{ and } h \geq w) \\ 0 & \text{otherwise} \end{cases} \quad (2\text{-}24)$$

where i, j are the indices for angle and offset of a geometric partition, which depend on the signaled geometric partition index. The sign of $\rho_{x,j}$ and $\rho_{y,j}$ depend on angle index i. The weights for each part of a geometric partition are derived as following:

$$wIdxL(x, y) = partIdx ? 32 + d(x, y): 32 - d(x, y) \quad (2\text{-}25)$$

$$w_0(x, y) = \frac{\text{Clip } 3(0, 8, (wIdxL(x, y) + 4) \gg 3)}{8} \quad (2\text{-}26)$$

$$w_1(x, y) = 1 - w_0(x, y) \quad (2\text{-}27)$$

Figure 22:
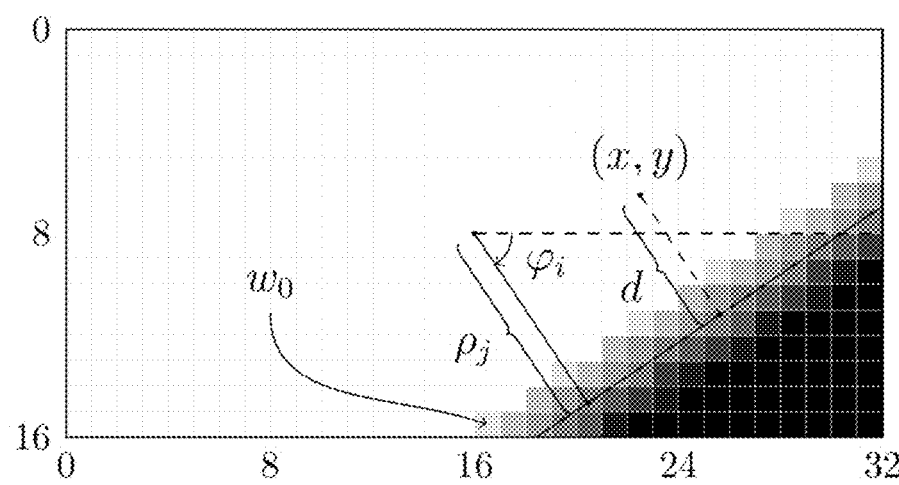
FIG. 22 illustrates exemplified generation of a bending weight w0 using geometric partitioning mode.

The partIdx depends on the angle index i. One example of weigh $w_0$ is illustrated in the schematic diagram 2200 of FIG. 22.

2.1.7.3. Motion Field Storage for Geometric Partitioning Mode

Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as:

$$sType = \quad (2\text{-}43)$$
$$\text{abs}(motion\ Idx) < 32 ? 2: (motionIdx \leq 0 ?(1 - partIdx): partIdx)$$

where motionIdx is equal to d(4x+2, 4y+2), which is recalculated from equation (2-36). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:

1) If Mv1 and Mv2 are from different reference picture lists (one from L0 and the other from L1), then Mv1 and Mv2 are simply combined to form the bi-prediction motion vectors.

2) Otherwise, if Mv1 and Mv2 are from the same list, only uni-prediction motion Mv2 is stored.

2.1.8. Multi-Hypothesis Prediction (MHP)

The multi-hypothesis prediction previously proposed in JVET-M0425 is adopted in this contribution. Up to two additional predictors are signalled on top of inter AMVP mode, regular merge mode, and MMVD mode. The resulting overall prediction signal is accumulated iteratively with each additional prediction signal.

$$p_{n+1} = (1 - \alpha_{n+1})p_n + \alpha_{n+1}h_{n+1}$$

The weighting factor $\alpha$ is specified according to the following table:

| add_hyp_weight_idx | $\alpha$ |
|---|---|
| 0 | $\frac{1}{4}$ |
| 1 | $-\frac{1}{8}$ |

For inter AMVP mode, MHP is only applied if non-equal weight in BCW is selected in bi-prediction mode.

3. Problems

There are several issues in the existing video coding techniques, which would be further improved for higher coding gain.

(1) The conventional MHP allows AMVP coded prediction or Merge coded prediction as additional hypothesis, and the mhp data (such as merge or AMVP predictor index, weight index, AMVP reference index) are explicitly signalled, which may be suboptimal.

(2) The conventional MHP generates additional merge predictions based on the uni-directional GEO merge list, which may be suboptimal.

4. Embodiments of the present disclosure

Embodiments of the present disclosure below should be considered as examples to explain general concepts. These embodiments should not be interpreted in a narrow way. Furthermore, these embodiments can be combined in any manner.

The terms 'video unit' or 'coding unit' or 'block' may represent a coding tree block (CTB), a coding tree unit (CTU), a coding block (CB), a CU, a PU, a TU, a PB, a TB. In embodiments, regarding "a block coded with mode N", here "mode N" may be a prediction mode (e.g., MODE_INTRA, MODE_INTER, MODE_PLT, MODE_IBC, and etc.), or a coding technique (e.g., AMVP, Merge, SMVD, BDOF, PROF, DMVR, AMVR, TM, Affine, CIIP, GPM, MMVD, BCW, HMVP, SbTMVP, and etc.).

A "multiple hypothesis prediction" in embodiments may refer to any coding tool that combining/blending more than one prediction/composition/hypothesis into one for later reconstruction process. For example, a composition/hypothesis may be INTER mode coded, INTRA mode coded, or any other coding mode/method like CIIP, GPM, MHP, and etc.

In the following discussion, a "base hypothesis" of a multiple hypothesis prediction block may refer to a first hypothesis/prediction with a first set of weighting values, and generally, a "base hypothesis" may be a prediction unit generated from a certain prediction mode (such as MODE INTER, or MODE_INTRA, and etc).

In the following discussion, an "additional hypothesis" of a multiple hypothesis prediction block may refer to a second hypothesis/prediction with a second set of weighting values, and generally, syntax elements for an "additional hypothesis" are additionally signaled associated with syntax elements of a "base hypothesis". There might be more than one additional hypothesis associated with a "base hypothesis". A multiple hypothesis prediction video unit is generally a hybrid prediction unit, in which final prediction samples are blended from a "base hypothesis" and one or more "additional hypotheses".

1. In one example, motion data of additional hypothetic candidates (rather than base hypothesis) may be reordered.

a. For example, the motion data may refer to the motion information of AMVP coded additional hypothesis candidates.

b. For example, the motion data may refer to the motion information of MERGE coded additional hypothesis candidates.

c. For example, the motion data of motion candidates may refer to motion vectors, prediction directions, reference indices, BCW indices, Half-pel interpolation filter information, integer motion vector information, and etc.

d. For example, the motion candidates of merge based additional hypotheses may be reordered.

i. For example, the merge based additional hypotheses may be generated based on a prediction list different from regular merge list.

ii. For example, the motion candidates to be reordered may include merge candidate indexes, motion vectors, BCW indexes, IMV information, half-pel interpolation filter information, etc.

e. For example, the motion candidates of AMVP based additional hypotheses may be reordered.

i. For example, the AMVP based additional hypotheses may be generated based on a prediction list different from regular AMVP list.

ii. For example, the motion candidates to be reordered may include AMVP candidate indexes, motion vectors, reference indexes, reference directions, BCW indexes, IMV information, half-pel interpolation filter information, etc.

f. For example, the reordering process may be based on a rule of template cost.

i. For example, the template cost may be calculated from neighboring samples of current video unit in the current picture, and a corresponding template (pointed by the motion candidate of each hypothesis) in the reference picture.

g. For example, the reordering process may be based on a rule of bilateral matching cost.

i. For example, the bilateral cost may be calculated based on a corresponding block in the first reference picture, and a second corresponding block in the second reference picture.

2. In one example, an additional hypothesis may be refined by decoder side methods.

a. For example, motion candidates of additional hypotheses may be firstly reordered, and then refined by decoder side methods.

b. For example, motion candidates of additional hypotheses may be firstly refined by decoder side methods, then reordered.

c. For example, motion candidates of additional hypotheses may be firstly refined by decoder side methods, without reordering.

d. For example, motion of an additional hypothesis may be further refined by template matching based methods.

e. For example, motion of an additional hypothesis may be further refined by bilateral matching based methods.

f. For example, whether and/or how to refine the motion of the additional hypothesis may be dependent on the coding information.

i. For example, whether to refine the motion of the additional hypothesis may be dependent on the coding method of the base hypothesis.

ii. For example, if the base hypothesis is template matching coded, the motion of the additional hypothesis (AMVP and/or Merge coded additional hypothesis) may be further refined.

iii. For example, if the base hypothesis is bilateral matching coded, the motion of the additional hypothesis (AMVP and/or Merge coded additional hypothesis) may be further refined.

iv. For example, no matter whether the based hypothesis is template matching (and/or bilateral matching) coded, the motion of the additional hypothesis (AMVP and/or Merge coded additional hypothesis) may be further refined.

g. For example, whether the motion of the additional hypothesis is further refined or not may be signalled through syntax elements.

i. For example, a syntax element (e.g., flag) may be further signalled indicating whether the motion of the additional hypothesis is further refined by template matching (or bilateral matching) or not.

ii. For example, if the additional hypothesis is merge coded, a syntax element (e.g., flag) may be further signalled indicating whether the motion of it is further refined by template matching (or bilateral matching) or not.

iii. For example, if the additional hypothesis is AMVP coded, a syntax element (e.g., flag) may be further signalled indicating whether the motion of it is further refined by template matching (or bilateral matching) or not.

3. In one example, a piece of prediction data (e.g., coding information such as prediction index, prediction direction, reference index, motion vectors, etc) of a video unit (e.g., PU/CU) may be implicitly derived (rather than signaling in the bitstream) based on coding information.

a. For example, the implicit derivation/determination method may be based on decoder side template matching, which takes a first template in the current picture and a second template in the reference picture into account.

i. For example, the first template in the current picture is constructed from neighboring samples adjacent to the current video unit.

ii. For example, a cost (such as SAD, SATD, SSE) between the two templates may be used as a criterion to fulfill the implicit derivation process.

b. For example, the implicit derivation/determination method may be based on decoder side bilateral matching, which takes a first reference unit in the first reference picture and a second reference unit in the second reference picture into account.

i. For example, a cost (such as SAD, SATD, SSE) between the two reference units may be used as a criterion to fulfill the implicit derivation process.

c. In one example, a piece of AMVP prediction data may be implicitly derived based on coding information.

i. For example, the AMVP prediction data may refer to a normal AMVP prediction, or a AMVP based base hypothesis, or an AMVP based additional hypothesis.

ii. For example, predictor/candidate index (such as AMVP index) of an AMVP based prediction/hypothesis may be implicitly derived based on coding information.

1. For example, a template may be firstly constructed for each possible AMVP predictor/candidate, and then a template matching cost may be calculated (between the template of current video unit and the template of the predictor) for each AMVP predictor/candidate. Finally, the predictor with minimum distortion may be determined as the implicitly derived predictor/candidate.

iii. For example, reference index (such as AMVP reference index) of a hypothesis may be implicitly derived based on coding information.

1. For example, distortions/costs may be calculated from different reference pictures—based on neighboring samples coded prior to the current video unit, or reference samples in the reference pictures—then the reference index with minimum cost may be determined.

d. In one example, a piece of MERGE prediction data may be implicitly derived based on coding information.

i. For example, the MERGE prediction data may refer to a normal MERGE prediction, or a variant MERGE prediction (such as GEO, CIIP, Affine Merge, Subblock Merge, SbTMVP, MMVD, TM merge, etc), or a MERGE based base hypothesis, or an MERGE based additional hypothesis.

ii. For example, predictor/candidate index (such as Merge index) of a Merge based prediction/hypothesis may be implicitly derived based on coding information.

1. For example, a template may be firstly constructed for each possible Merge predictor/candidate, and then a template matching cost may be calculated (between the template of current video unit and the template of the predictor) for each Merge predictor/candidate. Finally, the predictor with minimum distortion may be determined as the implicitly derived predictor/candidate.

e. In one example, a piece of multiple hypothesis data may be implicitly derived based on coding information.

i. For example, the hypothesis may be an additional hypothesis, or a base hypothesis.

ii. For example, the multiple hypothesis data may refer to coding information of an additional hypothesis.

iii. For example, the multiple hypothesis data may refer to coding information of a base hypothesis.

iv. For example, weight index/value of a hypothesis may be implicitly derived based on coding information.

1. For example, the coding information may refer to mode information or sample values of neighboring coded video units.

v. For example, how to predict an additional hypothesis may be implicitly derived.

1. For example, whether an additional hypothesis is coded based on AMVP or Merge may be implicitly determined (rather than signaling in the bitstream) based on coding information.

4. In one example, when calculating a template matching cost/distortion/error of a multiple hypothesis prediction block, a first prediction of a template may be further blended with a second prediction of the template.

a. For example, the multiple hypothesis prediction mode may refer to CIIP, MHP, GEO, etc.

b. For example, the template generation and template matching cost/distortion/error calculation may be used for a decode side methods such as template matching, bilateral matching, candidate list reordering, candidate index implicit derivation, weight index implicit derivation, etc.

i. For example, a template may be generated from prior-coded samples other than samples inside the current coding block.

c. For example, a first prediction of the template may be generated following a pre-defined rule.

i. For example, for bilateral matching, a first prediction of a first template may be generated from corresponding samples (with the sample shape of current coding block in the current picture) in a first reference picture, and a first prediction of a second template may be generated from corresponding samples (with the sample shape of current coding block in the current picture) in a second reference picture.

ii. For example, for template matching, a first prediction of a first template may be generated from neighboring samples of the current coding block in the current picture, and a first prediction of a second template may be generated from corresponding samples (with the same shape of the template in the current picture) in a reference picture.

d. For example, a second prediction (in addition to the first prediction) may be further applied to the template, and then, the second prediction and the first prediction of the template may be blended/fused together to construct the final template.

i. For example, an intra prediction may be further applied to the template and blended with the first prediction/reconstruction samples of the template.

1. For example, if the current coding mode is CIIP/MHP/GEO which blends an inter prediction and an intra prediction together, in addition to the first prediction of the template, an intra prediction may be further applied to the template (here the intra prediction is perceived as the second prediction of the template). Finally, the two predictions of the template are blended/fused for template cost computation.

ii. For example, an inter prediction may be further applied to the template and blended with the first prediction/reconstruction samples of the template.

1. For example, if the current coding mode is CIIP/MHP/GEO which blends a first inter prediction and a second inter prediction together, in addition to the first prediction of the template, an inter prediction may be further applied to the template (here the inter prediction is perceived as the second prediction of the template).

Finally, the two predictions of the template are blended/fused for template cost computation.

e. For example, how many predictions and/or what predictions are applied to a template may be dependent on the current coding mode of the current block.

i. For example, if the current coding mode is CIIP/ MHP/GEO which blends from M (such as M>1) predictions, then N prediction methods may be applied to the template (wherein N<=M), and the N predictions of the template are blended/fused for template cost computation.

ii. For example, the intra prediction mode used to generate the second intra prediction of a template may be based on the intra prediction mode of one of the intra hypotheses of current block.

iii. For example, the motion information used to generate the second inter prediction of a template may be based on the motion information of one of the inter hypotheses of current block.

5. In one example, prediction of a hypothesis may be generated based on virtual constructed motion data.

a. For example, prediction of an additional hypothesis may be generated based on virtual constructed motion data.

b. For example, the virtual constructed motion may be based on an AMVP-MERGE candidate list.

i. For example, the AMVP-MERGE candidate list may be generated based on at least one AMVP motion candidate information and at least one MERGE motion candidate information.

ii. For example, the AMVP-MERGE candidate list may be reordered.

iii. For example, the motion candidates in the AMVP-MERGE motion candidate list may be refined.

c. For example, the virtual constructed motion may be based on a bi-directional virtual motion candidate.

i. For example, the bi-directional virtual motion candidate may be generated based on a certain AMVP candidate list.

ii. For example, the bi-directional virtual motion candidate may be generated based on a certain MERGE candidate list, such as regular merge candidate list, or MMVD candidate list, or TM merge list, or GEO merge list, or CIIP merge list, or subblock merge list, etc.

iii. For example, the bi-directional virtual motion candidate may be generated based on a reordered motion candidate list.

iv. For example, the bi-directional virtual motion candidate may be further refined.

d. For example, the virtual constructed motion may be based on a uni-directional virtual motion candidate.

i. For example, the uni-directional virtual motion candidate may be generated based on a certain AMVP candidate list.

ii. For example, the uni-directional virtual motion candidate may be generated based on a certain MERGE candidate list, such as regular merge candidate list, or MMVD candidate list, or TM merge list, or GEO merge list, or CIIP merge list, or subblock merge list, etc.

iii. For example, the uni-directional virtual motion candidate may be generated based on a reordered motion candidate list.

iv. For example, the uni-directional virtual motion candidate may be further refined.

e. For example, prediction of a base hypothesis may be generated based on virtual constructed motion data.

i. For example, an AMVP-MERGE coded block may be perceived as a base hypothesis, and at least one additional hypothesis may be applied to it. Finally, the final prediction of the AMVP-MERGE coded block is generated by blending the base hypothesis and additional hypotheses together.

6. In one example, bi-predicted and/or uni-predicted additional hypothesis may be allowed for a multiple hypothesis prediction unit.

a. For example, at most M (such as M=1) bi-directional coded additional hypothesis is allowed for a multiple hypothesis prediction unit.

i. For example, the bi-directional hypothesis may be generated based on a virtual generated prediction list (such as AMVP-MERGE list).

ii. For example, the bi-directional hypothesis may be generated based on a bi-directional candidate from a certain merge list.

iii. For example, the bi-directional hypothesis may be generated based on a bi-directional candidate from a certain AMVP list.

b. For example, at most N (such as M=2) uni-directional coded additional hypotheses are allowed for a multiple hypothesis prediction unit.

c. For example, both uni-predicted additional hypothesis and bi-predicted additional hypothesis may be allowed for a multiple hypothesis prediction unit.

d. For example, only bi-predicted additional hypothesis may be allowed for a multiple hypothesis prediction unit.

e. For example, only uni-predicted additional hypothesis may be allowed for a multiple hypothesis prediction unit.

General Claims

1. Whether to and/or how to apply the disclosed methods above may be signalled at sequence level/group of pictures level/picture level/slice level/tile group level, such as in sequence header/picture header/SPS/VPS/ DPS/DCI/PPS/APS/slice header/tile group header.

2. Whether to and/or how to apply the disclosed methods above may be signalled at PB/TB/CB/PU/TU/CU/ VPDU/CTU/CTU row/slice/tile/sub-picture/other kinds of region contain more than one sample or pixel.

3. Whether to and/or how to apply the disclosed methods above may be dependent on coding information, such as block size, colour format, single/dual tree partitioning, colour component, slice/picture type.

Embodiments of the present disclosure are related to prediction blended from multiple compositions in image/ vide coding.

As used herein, the terms "video unit" or "coding unit" or "block" used herein may refer to one or more of: a color component, a sub-picture, a slice, a tile, a coding tree unit (CTU), a CTU row, a group of CTUs, a coding unit (CU), a prediction unit (PU), a transform unit (TU), a coding tree block (CTB), a coding block (CB), a prediction block(PB), a transform block (TB), a block, a sub-block of a block, a sub-region within the block, or a region that comprises more than one sample or pixel.

In this present disclosure, regarding "a block coded with mode N", the term "mode N" may be a prediction mode (e.g., MODE_INTRA, MODE_INTER, MODE_PLT, MODE_IBC, and etc.), or a coding technique (e.g., AMVP, Merge, SMVD, BDOF, PROF, DMVR, AMVR, TM, Affine, CIIP, GPM, MMVD, BCW, HMVP, SbTMVP, and etc.).

In the following discussion, a "base hypothesis" of a multiple hypothesis prediction block may refer to a first hypothesis/prediction with a first set of weighting values. In the following discussion, an "additional hypothesis" of a multiple hypothesis prediction block may refer to a second hypothesis/prediction with a second set of weighting values.

Figure 23:
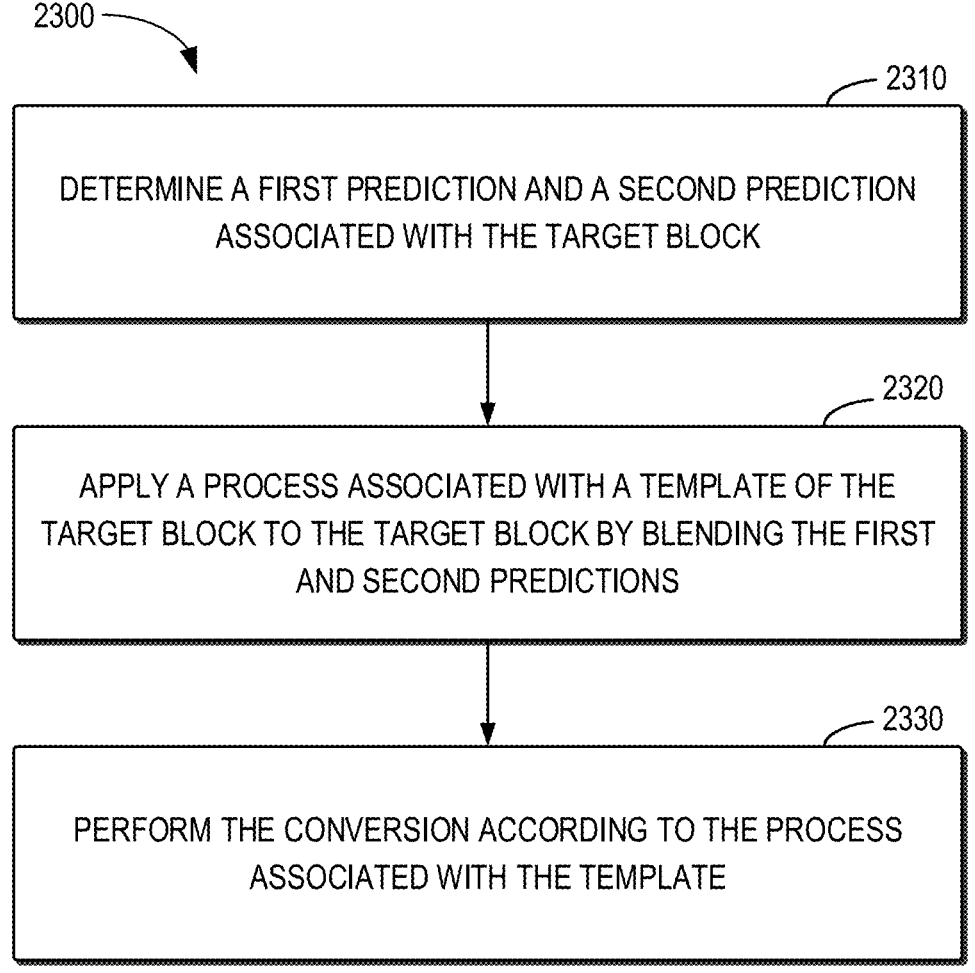
FIG. 23 illustrates a flow chart of a method according to embodiments of the present disclosure.

FIG. 23 illustrates a flowchart of a method 2300 for video processing in accordance with some embodiments of the present disclosure. The method 2300 may be implemented during a conversion between a video unit and a bitstream of the video unit.

As shown in FIG. 23, at block 2310, during a conversion between a target block of a video and a bitstream of the target block, a first prediction and a second prediction associated with the target block are determined. The target block is applied with a multiple hypothesis prediction coding mode. The term "multiple hypothesis prediction" in this present disclosure may refer to any coding tool that combining/blending more than one prediction/composition/hypothesis into one for later reconstruction process. For example, a composition/hypothesis may be INTER mode coded, INTRA mode coded, or any other coding mode/method like CIIP, GPM, MHP, and the like.

At block 2320, a process associated with a template of the target block is applied to the target block by blending the first and second predictions. In one example, when calculating a template matching cost/distortion/error of a multiple hypothesis prediction block, a first prediction of a template may be further blended with a second prediction of the template. For example, for GPM mode index reordering, the template may be constructed by blending a first template that is derived from prediction A motion and a second template that is derived from prediction B motion.

At block 2330, the conversion is performed according to the process associated with the template. In some embodiments, the conversion may comprise ending the video unit into the bitstream. Alternatively, the conversion may comprise decoding the video unit from the bitstream.

According to embodiments of the present disclosure, the MHP data can be derived instead of explicitly signaled. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, the process associated with the template may comprise at least one of: a generation of the template of the target block, a template matching cost of the target block, a template matching distortion of the target block, or a template matching error of the target block. In some embodiments, the first prediction of the template may be blended with the second prediction of the template, if one of the followings is calculated: a template matching cost of the target block, a template matching distortion of the target block, or a template matching error of the target block.

In some embodiments, the multiple hypothesis prediction coding mode may comprise at least one of: a combined inter and intra prediction (CIIP) mode, a multiple hypothesis prediction (MHP) mode, or a geometric partitioning mode (GPM).

In some embodiments, at least one of the followings may be used for a decode side method: a generation of the template of the target block, a template matching cost of the target block, a template matching distortion of the target block, or a template matching error of the target block. In some embodiments, the decode side method may comprise at least one of: a template matching, a bilateral matching, a candidate list reordering, a candidate index implicit derivation, or a weight index implicit derivation. For example, the template generation and template matching cost/distortion/ error calculation may be used for a decode side methods such as template matching, bilateral matching, candidate list reordering, candidate index implicit derivation, weight index implicit derivation and the like. By way of example, the template may be generated from a prior-coded sample other than a sample inside a current coding block of the target block.

In some embodiments, the second prediction may be applied to the template. In this case, in some embodiments, a final template may be constructed by combining the first prediction and the second prediction of the template. For example, a second prediction (in addition to the first prediction) may be further applied to the template, and then, the second prediction and the first prediction of the template may be blended/fused together to construct the final template.

In some embodiments, an intra prediction of the template may be applied to the template and combined with the first prediction or a reconstruction sample of the template. In some embodiment, if the multiple hypothesis prediction coding mode combines an inter predication and an intra prediction together, the intra prediction may be applied to the template. The first and second predictions of the template may be combined for a template cost computation. For example, if the current coding mode is CIIP/MHP/GEO which blends an inter prediction and an intra prediction together, in addition to the first prediction of the template, an intra prediction may be further applied to the template (here the intra prediction is perceived as the second prediction of the template). Finally, the two predictions of the template may be blended/fused for template cost computation.

In some embodiments, an inter prediction of the template may be applied to the template and combined with the first prediction or a reconstruction sample of the template. In this case, in some embodiments, if the multiple hypothesis prediction coding mode combines a first inter prediction and a second inter prediction together, the inter prediction may be applied to the template. The first and second predictions of the template may be combined for a template cost computation. For example, if the current coding mode is CIIP/MHP/GEO which blends a first inter prediction and a second inter prediction together, in addition to the first prediction of the template, an inter prediction may be further applied to the template (here the inter prediction is perceived as the second prediction of the template). Finally, the two predictions of the template may be blended/fused for template cost computation.

In some embodiments, the number of prediction method applied to the template may depend on the multiple hypothesis prediction coding mode. In some embodiments, a type of prediction applied to the template depends on the multiple hypothesis prediction coding mode. In other words, how many predictions and/or what predictions are applied to a template may be dependent on the current coding mode of the current block.

In some embodiments, if the multiple hypothesis prediction coding mode blends from a first number of predictions, a second number of prediction method may be blended for a template cost computation. For example, if the current coding mode is CIIP/MHP/GEO which blends from M (such as M>1) predictions, then N prediction methods may be applied to the template (wherein N<=M), and the N predictions of the template are blended/fused for template cost computation.

In some embodiments, a first intra prediction mode used to generate a second intra prediction of the template may be based on a second intra prediction mode of one of intra hypotheses of the target block. For example, the intra prediction mode used to generate the second intra prediction of a template may be based on the intra prediction mode of one of the intra hypotheses of current block.

In some embodiments, first motion information used to generate a second inter prediction of the template may be based on second motion information of one of inter hypotheses of the target block. For example, the motion information used to generate the second inter prediction of a template may be based on the motion information of one of the inter hypotheses of current block.

In some embodiments, the first prediction of the template may be generated based on a pre-defined rule. In some embodiments, for bilateral matching, a first prediction of a first template may be generated from samples in a first reference picture associated with the target block, and a first prediction of a second template may be generated from samples in a second reference picture associated with the target block. For example, for bilateral matching, a first prediction of a first template may be generated from corresponding samples (with the sample shape of current coding block in the current picture) in a first reference picture, and a first prediction of a second template may be generated from corresponding samples (with the sample shape of current coding block in the current picture) in a second reference picture.

In some embodiments, for template matching, a first prediction of a first template may be generated from a first set of neighbor samples of the target block in a current picture, and a first prediction of a second template may be generated from a second set of neighbor samples in a reference picture. For example, for template matching, a first prediction of a first template may be generated from neighboring samples of the current coding block in the current picture, and a first prediction of a second template may be generated from corresponding samples (with the same shape of the template in the current picture) in a reference picture.

In some embodiments, for GPM mode index reordering, the template may be constructed by combining a first template and a second template. In this case, the first template may be derived from a first prediction motion and the second template may be derived from a second prediction motion.

In some embodiments, an indication of whether to and/or how to apply the process associated with a template of the target block by blending the first and second predictions may be indicated at one of the followings: a sequence level, a group of pictures level, a picture level, a slice level, or a tile group level.

In some embodiments, an indication of whether to and/or how to apply the process associated with a template of the target block by blending the first and second predictions may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to apply the process associated with a template of the target block by blending the first and second predictions may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, coding information of the target block, whether to and/or how to apply the process associated with a template of the target block by blending the first and second predictions may be determined based on coding information of the target block. The coding information may comprise at least one of: a block size, a colour format, a single and/or dual tree partitioning, a colour component, a slice type, or a picture type.

In some embodiments, a first prediction and a second prediction associated with a target block of the video are determined. The target block of the video is applied with a multiple hypothesis prediction coding mode. A process associated with a template of the target block is applied by blending the first and second predictions. A bitstream of the video unit is generated according to the process associated with the template.

In some embodiments, a first prediction and a second prediction associated with a target block of the video are determined. The target block of the video is applied with a multiple hypothesis prediction coding mode. A process associated with a template of the target block is applied by blending the first and second predictions. A bitstream of the video unit is generated according to the process associated with the template. The bitstream is stored in a non-transitory computer-readable recording medium.

Figure 24:
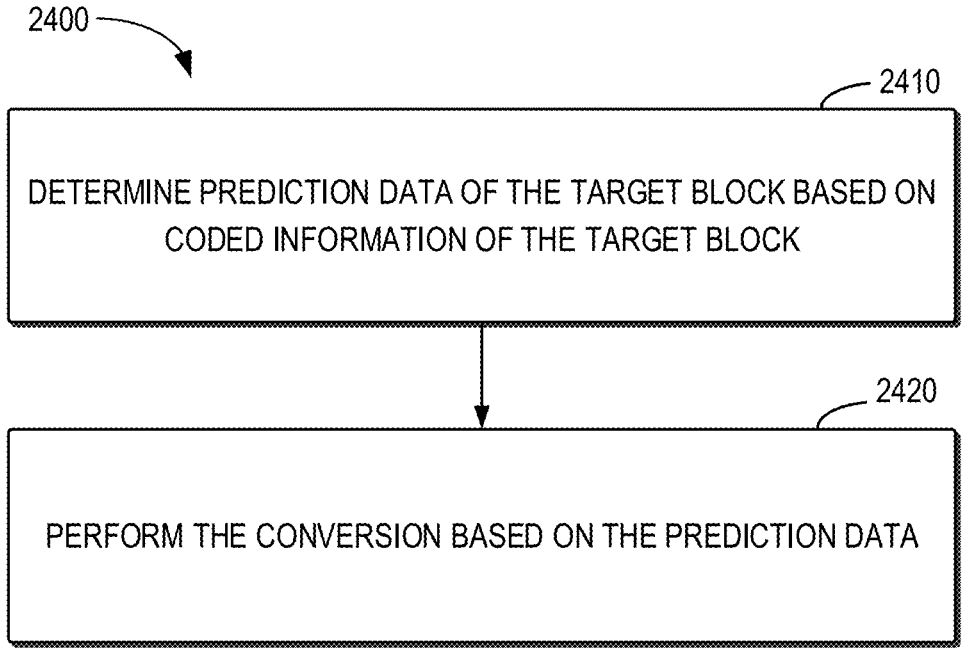
FIG. 24 illustrates a flow chart of a method according to embodiments of the present disclosure.

FIG. 24 illustrates a flowchart of a method 2400 for video processing in accordance with some embodiments of the present disclosure. The method 2400 may be implemented during a conversion between a video unit and a bitstream of the video unit.

As shown in FIG. 24, at block 2410, during a conversion between a target block of a video and a bitstream of the target block, prediction data of the target block is determined based on coding information of the target block. In one example, a piece of prediction data (e.g., coding information such as prediction index, prediction direction, reference index, motion vectors, etc) of a video unit (e.g., PU/CU) may be implicitly derived (rather than signaling in the bitstream) based on coding information.

At block 2420, the conversion is performed based on the prediction data. In some embodiments, the conversion may comprise ending the video unit into the bitstream. Alternatively, the conversion may comprise decoding the video unit from the bitstream.

According to embodiments of the present disclosure, the MHP data can be derived instead of explicitly signaled. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, the prediction data may comprise multiple hypothesis data of the target block. The multiple hypothesis data of the target block may be implicitly derived based on the coding information.

In some embodiments, a weight index or a weight value of a hypothesis may be implicitly derived based on the coding information. In some embodiments, the weight index for combining a first hypothesis and a second hypothesis for MHP may be implicitly derived based on template matching cost. In some embodiments, the hypothesis may comprise at least one of: an additional hypothesis of the target block, or a base hypothesis of the target block. In some embodiments, the multiple hypothesis data may comprise at least one of: coding information of an additional hypothesis of the target block, or coding information of a base hypothesis of the target block. For example, weight index/value of a hypothesis may be implicitly derived based on coding information. By way of example, the weight index for blending a first hypothesis and a second hypothesis for MHP may be implicitly derived based on template matching cost. In some embodiments, the coding information may comprise at least one of: mode information of a neighbor coded video unit associated with the target block, or a sample value of the neighbor coded video unit associated with the target block. For example, the coding information may refer to mode information or sample values of neighboring coded video units.

In some embodiments, how to predict an additional hypothesis of the target block may be implicitly derived. In some embodiments, whether an additional hypothesis of the target block is coded based on advanced motion vector prediction (AMVP) or merge prediction may be determined based on the coding information. For example, whether an additional hypothesis is coded based on AMVP or Merge may be implicitly determined (rather than signaling in the bitstream) based on coding information.

In some embodiments, the determining may be based on a decoder side template matching which is associated with a first template in a current picture and a second template in a reference picture. For example, the implicit derivation/determination method may be based on decoder side template matching, which takes a first template in the current picture and a second template in the reference picture into account.

In some embodiments, the first template in the current picture may be constructed from a set of neighbor samples adjacent to the target block. For example, the first template in the current picture is constructed from neighboring samples adjacent to the current video unit.

In some embodiments, a cost between the first template and the second template may be used as a criterion to fulfill the determining. For example, a cost (such as SAD, SATD, SSE) between the two templates may be used as a criterion to fulfill the implicit derivation process.

In some embodiments, the determining may be based on a decoder side bilateral matching which is associated with a first reference unit in a first reference picture and a second reference unit in a second reference picture. For example, the implicit derivation/determination method may be based on decoder side bilateral matching, which takes a first reference unit in the first reference picture and a second reference unit in the second reference picture into account.

In some embodiments, a cost between the first reference unit and the second reference unit may be used as a criterion to fulfill the determining. For example, a cost (such as SAD, SATD, SSE) between the two reference units may be used as a criterion to fulfill the implicit derivation process.

In some embodiments, the prediction data may comprise AMVP prediction data of the target block, and the AMVP prediction data of the target block may be implicitly derived based on the coding information. In one example, a piece of AMVP prediction data may be implicitly derived based on coding information.

In some embodiments, the AMVP prediction data may comprise at least one of: a normal AMVP prediction, an AMVP based base hypothesis, or an AMVP based additional hypothesis.

In some embodiments, a predictor or a candidate index of an AMVP based prediction may be implicitly derived based on the coding information. Alternatively, the predictor or the candidate index of an AMVP based hypothesis may be implicitly derived based on the coding information. For example, predictor/candidate index (such as AMVP index) of an AMVP based prediction/hypothesis may be implicitly derived based on coding information.

In some embodiments, a template for each AMVP predictor or AMVP candidate may be constructed. In some embodiments, for each AMVP predictor or AMVP candidate, a template matching cost between a first template of the target block and a second template of AMVP predictor or AMVP candidate may be determined. A target AMVP predictor with minimum distortion may be determined as an implicitly derived AMVP predictor or AMVP candidate. For example, a template may be firstly constructed for each possible AMVP predictor/candidate, and then a template matching cost may be calculated (between the template of current video unit and the template of the predictor) for each AMVP predictor/candidate. Finally, the predictor with minimum distortion may be determined as the implicitly derived predictor/candidate.

In some embodiments, a reference index (for example, AMVP reference index) of a hypothesis may be implicitly derived based on the coding information. In some embodiments, a distortion or cost from difference reference pictures may be determined based on a set of neighbor samples coded prior to the target block or a set of reference samples in a set of reference pictures. In this case, in some embodiments, the reference index with minimum cost may be determined.

In some embodiments, the prediction data may comprise merge prediction data of the target block. The merge prediction data of the target block may be implicitly derived based on the coding information.

In some embodiments, the merge prediction data may comprise at least one of: a normal merge prediction, a variant of the merge prediction, a merge based base hypothesis, or a merge based additional hypothesis. For example, the MERGE prediction data may refer to a normal MERGE prediction, or a variant MERGE prediction (such as GEO, CIIP, Affine Merge, Subblock Merge, SbTMVP, MMVD, TM merge, etc), or a MERGE based base hypothesis, or an MERGE based additional hypothesis.

In some embodiments, a predictor or a candidate index (for example, merge index) of a merge based prediction may be implicitly derived based on the coding information. Alternatively, the predictor or the candidate index of a merge based hypothesis may be implicitly derived based on the coding information.

In some embodiments, a template may be constructed for each merge predictor or merge candidate. In some embodiments, for each merge predictor or merge candidate, a template matching cost between a first template of the target block and a second template of merge predictor or merge candidate may be determined. In this case, a target merge predictor with minimum distortion may be determined as an implicitly derived merge predictor or merge candidate. For example, a template may be firstly constructed for each possible Merge predictor/candidate, and then a template matching cost may be calculated (between the template of current video unit and the template of the predictor) for each Merge predictor/candidate. Finally, the predictor with minimum distortion may be determined as the implicitly derived predictor/candidate.

In some embodiments, an indication of whether to and/or how to determine prediction data of the target block may be indicated at one of the followings: sequence level, group of pictures level, picture level, slice level, or tile group level.

In some embodiments, an indication of whether to and/or how to determine prediction data of the target block may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to determine prediction data of the target block may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to determine prediction data of the target block may be determined based on coding information of the target block. The coding information may include at least one of: a block size, a colour format, a single and/or dual tree partitioning, a colour component, a slice type, or a picture type.

In some embodiments, prediction data of a target block of the video is determined based on coding information of the target block. A bitstream of the video unit is generated based on the prediction data.

In some embodiments, prediction data of a target block of the video is determined based on coding information of the target block. A bitstream of the video unit is generated based on the prediction data. The bitstream is stored in a non-transitory computer-readable recording medium.

Figure 25:
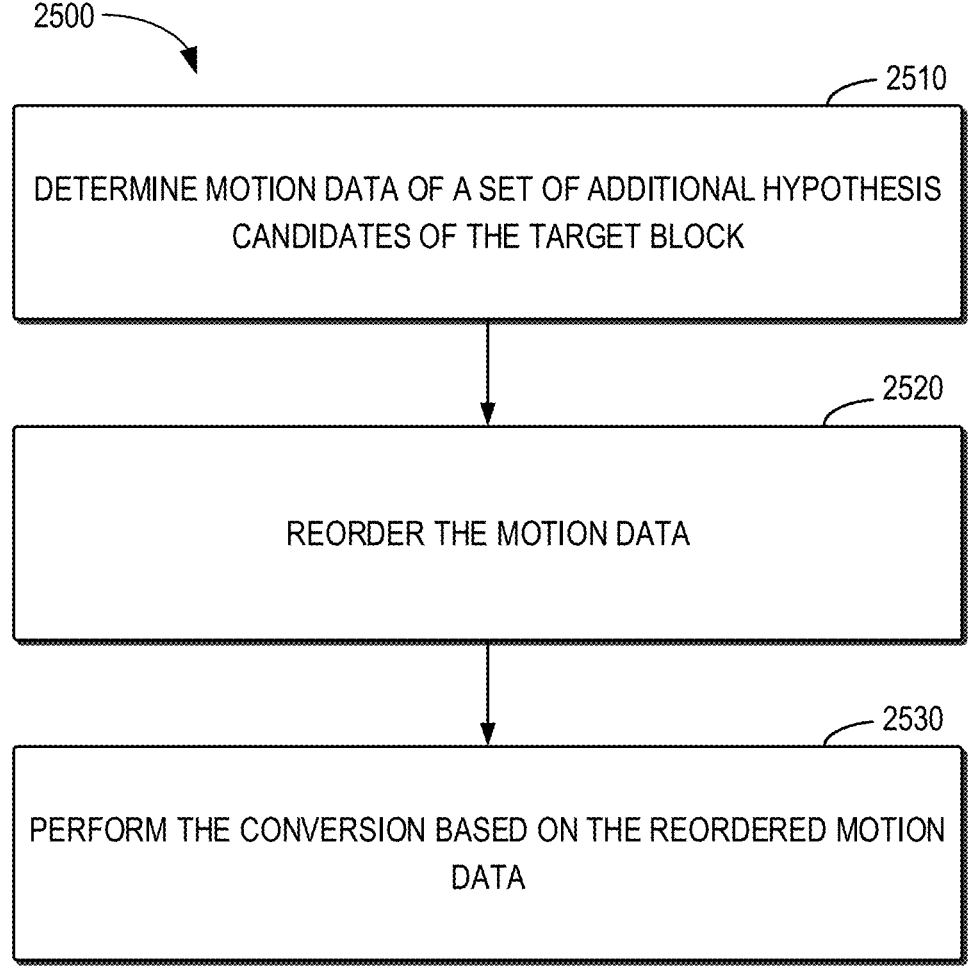
FIG. 25 illustrates a flow chart of a method according to embodiments of the present disclosure.

FIG. 25 illustrates a flowchart of a method 2500 for video processing in accordance with some embodiments of the present disclosure. The method 2500 may be implemented during a conversion between a video unit and a bitstream of the video unit.

As shown in FIG. 25, at block 2510, during a conversion between a target block of a video and a bitstream of the target block, motion data of a set of additional hypothesis candidates of the target block is determined.

At block 2520, the motion data is reordered. In some embodiments, the motion data may comprise at least one of: motion information of advanced motion vector prediction (AMVP) coded additional hypothesis candidates, or motion information of merge coded additional hypothesis candidates. In some embodiments, the motion data may comprise at least one of: a motion vector, a prediction direction, a reference index, a bi-prediction with coding unit (CU)-level weight (BCW) index, half-pel interpolation filter information, or integer motion vector information.

At block 2530, the conversion is performed based on the reordered motion data. In some embodiments, the conversion may comprise ending the video unit into the bitstream. Alternatively, the conversion may comprise decoding the video unit from the bitstream.

According to embodiments of the present disclosure, the MHP data can be derived instead of explicitly signaled. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, motion candidates of merge based additional hypotheses may be reordered. For example, the merge based additional hypotheses may be generated based on a prediction list different from a regular merge list. In some embodiments, the motion candidates to be reordered may comprise at least one of: a merge candidate index, a motion vector, a BCW index, IMV information, or half-pel interpolation filter information.

IMV information may refer to motion vector precision/resolution (such as ¼-pel, 1-pel, ½-pel, 4-pel, and etc). For example, IMV information may be AMVR (adaptive motion vector resolution) index. In the VVC reference software VTM, IMV is used to indicate the AMVR index of a coding unit.

In some embodiments, motion candidates of AMVP based additional hypotheses may be reordered. For example, the motion candidates to be reordered may comprise at least one of: a AMVP candidate index, a motion vector, a BCW index, IMV information, or half-pel interpolation filter information.

In some embodiments, the reordering may be based on a rule of a template cost. In some embodiments, the template cost may be calculated from a set of neighbor samples of the target block in a current picture and a corresponding template in a reference picture. For example, the template cost may be calculated from neighboring samples of current video unit in the current picture, and a corresponding template (pointed by the motion candidate of each hypothesis) in the reference picture.

In some embodiments, the reordering may be based on a rule of a bilateral matching cost. In some embodiments, the bilateral matching cost may be calculated based on a corresponding block in a first reference picture and a second corresponding block in a second reference picture.

In some embodiments, an indication of whether to and/or how to reorder the motion data may be indicated at one of the followings: sequence level, group of pictures level, picture level, slice level, or tile group level.

In some embodiments, an indication of whether to and/or how to reorder the motion data may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to reorder the motion data may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to reorder the motion data may be determined based on coding information of the target block. In some embodiments, the coding information may include at least one of: a block size, a colour format, a single and/or dual tree partitioning, a colour component, a slice type, or a picture type.

In some embodiments motion data of a set of additional hypothesis candidates of a target block of the video is determined. The motion data is reordered. A bitstream of the video unit is generated based on the reordered motion data.

In some embodiments, motion data of a set of additional hypothesis candidates of a target block of the video is determined. The motion data is reordered. A bitstream of the video unit is generated based on the reordered motion data. The bitstream is stored in a non-transitory computer-readable recording medium.

Figure 26:
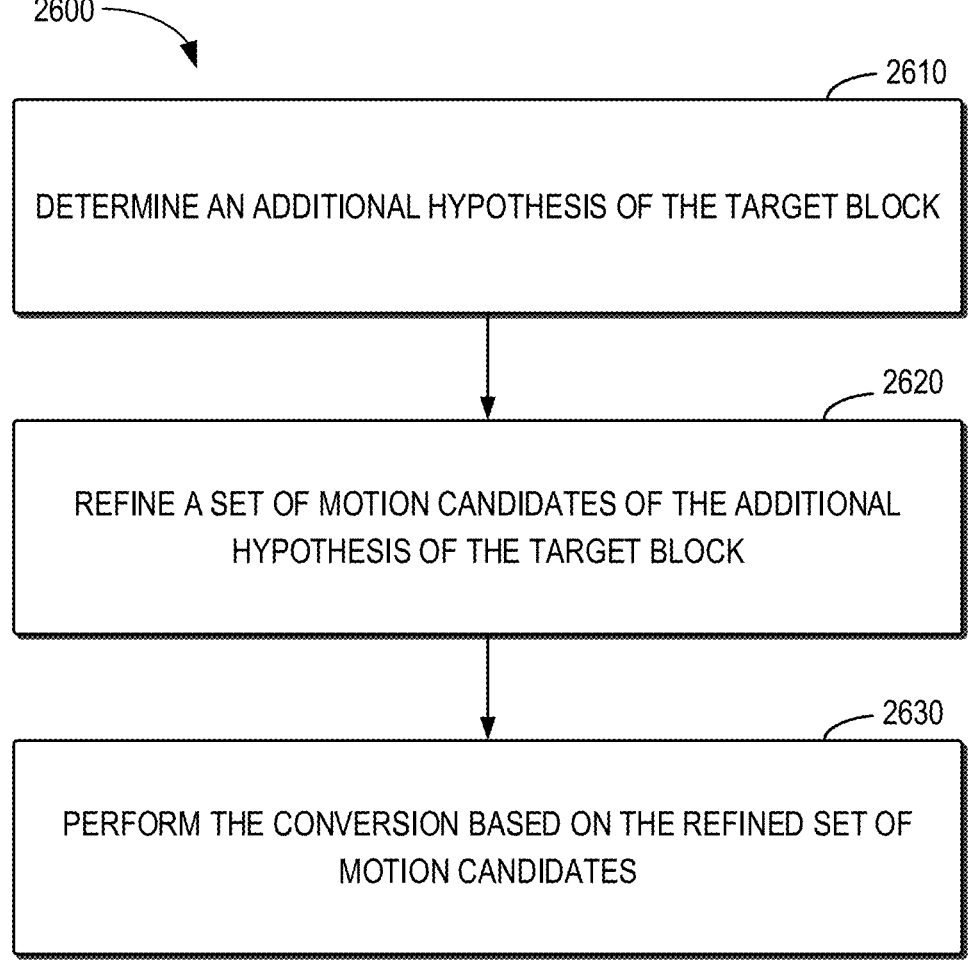
FIG. 26 illustrates a flow chart of a method according to embodiments of the present disclosure.

FIG. 26 illustrates a flowchart of a method 2600 for video processing in accordance with some embodiments of the present disclosure. The method 2600 may be implemented during a conversion between a video unit and a bitstream of the video unit.

As shown in FIG. 26, at block 2610, during a conversion between a target block of a video and a bitstream of the target block, an additional hypothesis of the target block is determined.

At block 2620, a set of motion candidates of the additional hypothesis of the target block is refined by a decoder side method.

At block 2630, the conversion is performed based on the refined set of motion candidates. In some embodiments, the conversion may comprise ending the video unit into the bitstream. Alternatively, the conversion may comprise decoding the video unit from the bitstream.

According to embodiments of the present disclosure, the MHP can generate additional merge predictions based on other list except for the uni-directional GEO merge list. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, motion candidates of the additional hypothesis may be firstly reordered, and then may be refined by the decoder side method. Alternatively, or in addition, the set of motion candidates of the additional hypothesis may be firstly refined by the decoder side method, then reordered. In some other embodiments, the set of motion candidates of the additional hypothesis may be firstly refined by the decoder side method, without reordering.

In some embodiments, the set of motion candidates of the additional hypothesis may be further refined by a template matching based method. In some other embodiments, the set of motion candidates of the additional hypothesis may be further refined by a bilateral matching based method.

In some embodiments, whether and/or how to refine the set of motion candidates of the additional hypothesis may depend on coding information of the target block. For example, whether to refine the set of motion candidates of the additional hypothesis may depend on a coding method of a base hypothesis of the target block.

In some embodiments, if the base hypothesis is template matching coded, the set of motion candidates of the additional hypothesis (for example, AMVP and/or Merge coded additional hypothesis) may be further refined.

In some embodiments, if the base hypothesis is bilateral matching coded, the set of motion candidates of the additional hypothesis (for example, AMVP and/or Merge coded additional hypothesis) may be further refined.

In some embodiments, regardless of whether the base hypothesis is bilateral matching coded or template matching coded, the set of motion candidates of the additional hypothesis may be further refined. For example, no matter whether the based hypothesis is template matching (and/or bilateral matching) coded, the motion of the additional hypothesis (AMVP and/or Merge coded additional hypothesis) may be further refined.

In some embodiments, whether the set of motion candidates of the additional hypothesis may be further refined or not is indicated through a syntax element. In some embodiments, the syntax element (for example, a flag) may be further indicated/signalled indicating whether the set of motion candidates of the additional hypothesis is further refined by template matching or not. Alternatively, or in addition, the syntax element (for example, flag) may be further indicated indicating whether the set of motion candidates of the additional hypothesis is further refined by bilateral matching or not.

In some embodiments, if the additional hypothesis is merge coded, the syntax element (for example, flag) may be further indicated indicating whether the set of motion candidates of the additional hypothesis if further refined by template matching or not. Alternatively, or in addition, if the additional hypothesis is merge coded, the syntax element (for example, flag) may be further indicated indicating whether the set of motion candidates of the additional hypothesis if further refined by bilateral matching or not.

In some embodiments, if the additional hypothesis is AMVP coded, the syntax element (for example, flag) may be further indicated indicating whether the set of motion candidates of the additional hypothesis if further refined by template matching or not. Alternatively, or in addition, if the additional hypothesis is AMVP coded, the syntax element (for example, flag) may be further indicated indicating whether the set of motion candidates of the additional hypothesis if further refined by bilateral matching or not.

In some embodiments, an indication of whether to and/or how to refine the set of motion candidates of the additional hypothesis may be indicated at one of the followings: a sequence level, a group of pictures level, a picture level, a slice level, or a tile group level.

In some embodiments, an indication of whether to and/or how to refine the set of motion candidates of the additional hypothesis may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to refine the set of motion candidates of the additional hypothesis may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to refine the set of motion candidates of the additional hypothesis may be determined based on coding information of the target block. The coding information may include at least one of: a block size, a colour format, a single and/or dual tree partitioning, a colour component, a slice type, or a picture type.

In some embodiments, an additional hypothesis of a target block of the video is determined. The a set of motion candidates of the additional hypothesis of the target block is refined by a decoder side method. A bitstream of the video unit is generated based on the refined set of motion candidates.

In some embodiments, an additional hypothesis of a target block of the video is determined. A set of motion candidates of the additional hypothesis of the target block is refined by a decoder side method. A bitstream of the video unit is generated based on the refined set of motion candidates. The bitstream is stored in a non-transitory computer-readable recording medium.

FIG. 27 illustrates a flowchart of a method 2700 for video processing in accordance with some embodiments of the present disclosure. The method 2700 may be implemented during a conversion between a video unit and a bitstream of the video unit.

As shown in FIG. 27, at block 2710, during a conversion between a target block of a video and a bitstream of the target block, a prediction of a hypothesis of the target block is determined based on virtual constructed motion data.

At block 2720, the conversion is performed based on the prediction. In some embodiments, the conversion may comprise ending the video unit into the bitstream. Alternatively, the conversion may comprise decoding the video unit from the bitstream.

According to embodiments of the present disclosure, the MHP can generate additional merge predictions based on other list except for the uni-directional GEO merge list. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, a prediction of an additional hypothesis of the target block may be generated based on the virtual constructed motion data. In some embodiments, the virtual constructed motion may be based on an AMVP-MERGE candidate list. In some embodiments, the AMVP-MERGE candidate list may be generated based on at least one AMVP motion candidate information and at least one MERGE motion candidate information. In some embodiments, the AMVP-MERGE candidate list is reordered. In some embodiments, motion candidates in the AMVP-MERGE motion candidate list are refined.

In some embodiments, the virtual constructed motion data may be based on a bi-directional virtual motion candidate. For example, the bi-directional virtual motion candidate may be generated based on a certain AMVP candidate list. In an example, the bi-directional virtual motion candidate may be generated based on a certain MERGE candidate list. The certain MERGE candidate list may comprise at least one of: a regular merge candidate list, a merge mode with motion vector difference (MMVD) candidate list, a template matching (TM) merge list, a GEO merge list, a combined inter intra prediction (CIIP) merge list, or a subblock merge list.

In some embodiments, the bi-directional virtual motion candidate may be generated based on a reordered motion candidate list. In some other embodiments, the bi-directional virtual motion candidate may be generated based on a reordered motion candidate list.

In some embodiments, the virtual constructed motion data may be based on a uni-directional virtual motion candidate. In some other embodiments, the uni-directional virtual motion candidate may be generated based on a certain AMVP candidate list. Alternatively, or in addition, the uni-directional virtual motion candidate may be generated based on a certain MERGE candidate list. In an example, the certain MERGE candidate list may comprise at least one of: a regular merge candidate list, a MMVD candidate list, a TM merge list, a GEO merge list, a CIIP merge list, or a subblock merge list.

In some embodiments, the uni-directional virtual motion candidate may be generated based on a reordered motion candidate list. In some other embodiments, the uni-directional virtual motion candidate may be further refined.

In some embodiments, a prediction of an additional hypothesis of the target block may be generated based on the virtual constructed motion data. In some embodiments, if an AMVP-MERGE coded block is perceived as the base hypothesis, at least one additional hypothesis may be applied to the AMVP-MERGE coded block. In this case, a final prediction of the AMVP-MERGE coded block may be generated by combining the base hypothesis and additional hypotheses together. For example, an AMVP-MERGE coded block may be perceived as a base hypothesis, and at least one additional hypothesis may be applied to it. Finally, the final prediction of the AMVP-MERGE coded block is generated by blending the base hypothesis and additional hypotheses together.

In some embodiments, at least one of: a bi-predicted additional hypothesis or a uni-predicted additional hypothesis may be allowed for a multiple hypothesis prediction unit. In some embodiments, a predetermined maximum number of bi-directional coded additional hypothesis may be allowed for the multiple hypothesis prediction unit. For example, at most M (such as M=1) bi-directional coded additional hypothesis is allowed for a multiple hypothesis prediction unit.

In some embodiments, the bi-directional hypothesis may be generated based on a virtual generated prediction list (such as AMVP-MERGE list). In some other embodiments, the bi-directional hypothesis may be generated based on a bi-directional candidate from a certain merge list. Alternatively, or in addition, the bi-directional hypothesis may be generated based on a bi-directional candidate from a certain AMVP list.

In some embodiments, a predetermined maximum number of uni-directional coded additional hypotheses may be allowed for the multiple hypothesis prediction unit. For example, at most N (such as M=2) uni-directional coded additional hypotheses are allowed for a multiple hypothesis prediction unit.

In some embodiments, both uni-predicted additional hypothesis and bi-predicted additional hypothesis may be allowed for the multiple hypothesis prediction unit. In some other embodiments, only bi-predicted additional hypothesis may be allowed for the multiple hypothesis prediction unit. Alternatively, only uni-predicted additional hypothesis may be allowed for the multiple hypothesis prediction unit.

In some embodiments, an indication of whether to and/or how to generate the prediction of the hypothesis of the target block may be indicated at one of the followings: a sequence level, a group of pictures level, a picture level, a slice level, or a tile group level.

In some embodiments, an indication of whether to and/or how to generate the prediction of the hypothesis of the target block may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to generate the prediction of the hypothesis of the target block may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to generate the prediction of the hypothesis of the target block may be determined based on coding information of the target block. The coding information may include at least one of: a block size, a colour format, a single and/or dual tree partitioning, a colour component, a slice type, or a picture type.

In some embodiments, a prediction of a hypothesis of a target block based of the video on virtual constructed motion data is determined. A bitstream of the video unit is generated based on the prediction.

In some embodiments, a prediction of a hypothesis of a target block based of the video on virtual constructed motion data is determined. A bitstream of the video unit is generated based on the prediction. The bitstream is stored in a non-transitory computer-readable recording medium.

Embodiments of the present disclosure can be implemented separately.

Alternatively, embodiments of the present disclosure can be implemented in any proper combinations. Implementations of the present disclosure can be described in view of the following clauses, the features of which can be combined in any reasonable manner.

Clause 1. A method of video processing, comprising: determining, during a conversion between a target block of a video and a bitstream of the target block, a first prediction and a second prediction associated with the target block, the target block being applied with a multiple hypothesis prediction coding mode; applying a process associated with a template of the target block to the target block by blending the first and second predictions; and performing the conversion according to the process associated with the template.

Clause 2. The method of clause 1, wherein the process associated with the template comprises at least one of: a generation of the template of the target block, a template matching cost of the target block, a template matching distortion of the target block, or a template matching error of the target block.

Clause 3. The method of clause 1, wherein the first prediction of the template is blended with the second prediction of the template, if one of the followings is calculated: a template matching cost of the target block, a template matching distortion of the target block, or a template matching error of the target block.

Clause 4. The method of clause 1, wherein the multiple hypothesis prediction coding mode comprises at least one of: a combined inter and intra prediction (CIIP) mode, a multiple hypothesis prediction (MHP) mode, or a geometric partitioning mode (GPM).

Clause 5. The method of clause 1, wherein at least one of the followings is used for a decode side method: a generation of the template of the target block, a template matching cost of the target block, a template matching distortion of the target block, or a template matching error of the target block.

Clause 6. The method of clause 5, wherein the decode side method comprises at least one of: a template matching, a bilateral matching, a candidate list reordering, a candidate index implicit derivation, or a weight index implicit derivation, and wherein the template is generated from a prior-coded sample other than a sample inside a current coding block of the target block.

Clause 7. The method of clause 1, wherein the second prediction is applied to the template, and wherein the method further comprising: constructing a final template by combining the first prediction and the second prediction of the template.

Clause 8. The method of clause 1, wherein an intra prediction of the template is applied to the template and combined with the first prediction or a reconstruction sample of the template.

Clause 9. The method of clause 8, wherein if the multiple hypothesis prediction coding mode combines an inter predication and an intra prediction together, the intra prediction is applied to the template, and wherein the first and second predictions of the template are combined for a template cost computation.

Clause 10. The method of clause 1, wherein an inter prediction of the template is applied to the template and combined with the first prediction or a reconstruction sample of the template.

Clause 11. The method of clause 10, wherein if the multiple hypothesis prediction coding mode combines a first inter prediction and a second inter prediction together, the inter prediction is applied to the template, and wherein the first and second predictions of the template are combined for a template cost computation.

Clause 12. The method of clause 1, wherein the number of prediction method applied to the template depends on the multiple hypothesis prediction coding mode.

Clause 13. The method of clause 12, wherein if the multiple hypothesis prediction coding mode blends from a first number of predictions, a second number of prediction method are blended for a template cost computation.

Clause 14. The method of clause 1, wherein a type of prediction applied to the template depends on the multiple hypothesis prediction coding mode.

Clause 15. The method of clause 14, wherein a first intra prediction mode used to generate a second intra prediction of the template is based on a second intra prediction mode of one of intra hypotheses of the target block.

Clause 16. The method of clause 14, wherein first motion information used to generate a second inter prediction of the template is based on second motion information of one of inter hypotheses of the target block.

Clause 17. The method of clause 1, wherein the first prediction of the template is generated based on a pre-defined rule.

Clause 18. The method of clause 17, wherein for bilateral matching, a first prediction of a first template is generated from samples in a first reference picture associated with the target block, and a first prediction of a second template is generated from samples in a second reference picture associated with the target block.

Clause 19. The method of clause 17, wherein for template matching, a first prediction of a first template is generated from a first set of neighbor samples of the target block in a current picture, and a first prediction of a second template is generated from a second set of neighbor samples in a reference picture.

Clause 20. The method of clause 1, wherein for GPM mode index reordering, the template is constructed by combining a first template and a second template, the first template is derived from a first prediction motion and the second template is derived from a second prediction motion.

Clause 21. The method of any of clauses 1-20, wherein an indication of whether to and/or how to apply the process associated with a template of the target block by blending the first and second predictions is indicated at one of the followings: a sequence level, a group of pictures level, a picture level, a slice level, or a tile group level.

Clause 22. The method of any of clauses 1-20, wherein an indication of whether to and/or how to apply the process associated with a template of the target block by blending the first and second predictions is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 23. The method of any of clauses 1-20, wherein an indication of whether to and/or how to apply the process associated with a template of the target block by blending the first and second predictions is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 24. The method of any of clauses 1-20, further comprising: determining, based on coding information of the target block, whether to and/or how to apply the process associated with a template of the target block by blending the first and second predictions, the coding information including at least one of: a block size, a colour format, a single and/or dual tree partitioning, a colour component, a slice type, or a picture type.

Clause 25. A method of video processing, comprising: determining, during a conversion between a target block of a video and a bitstream of the target block, prediction data of the target block based on coding information of the target block; and performing the conversion based on the prediction data.

Clause 26. The method of clause 25, wherein the prediction data comprises multiple hypothesis data of the target block, and the multiple hypothesis data of the target block is implicitly derived based on the coding information.

Clause 27. The method of clause 26, wherein a weight index or a weight value of a hypothesis is implicitly derived based on the coding information.

Clause 28. The method of clause 27, wherein the coding information comprises at least one of: mode information of a neighbor coded video unit associated with the target block, or a sample value of the neighbor coded video unit associated with the target block.

Clause 29. The method of clause 27, wherein the weight index for combining a first hypothesis and a second hypothesis for MHP is implicitly derived based on template matching cost.

Clause 30. The method of clause 27, wherein the hypothesis comprises at least one of: an additional hypothesis of the target block, or a base hypothesis of the target block.

Clause 31. The method of clause 26, wherein the multiple hypothesis data comprises at least one of: coding information of an additional hypothesis of the target block, or coding information of a base hypothesis of the target block.

Clause 32. The method of clause 26, wherein how to predict an additional hypothesis of the target block is implicitly derived.

Clause 33. The method of clause 26, further comprising: determining, based on the coding information, whether an additional hypothesis of the target block is coded based on advanced motion vector prediction (AMVP) or merge prediction.

Clause 34. The method of clause 25, wherein the determining is based on a decoder side template matching which is associated with a first template in a current picture and a second template in a reference picture.

Clause 35. The method of clause 34, wherein the first template in the current picture is constructed from a set of neighbor samples adjacent to the target block.

Clause 36. The method of clause 34, wherein a cost between the first template and the second template is used as a criterion to fulfill the determining.

Clause 37. The method of clause 25, wherein the determining is based on a decoder side bilateral matching which is associated with a first reference unit in a first reference picture and a second reference unit in a second reference picture.

Clause 38. The method of clause 37, wherein a cost between the first reference unit and the second reference unit is used as a criterion to fulfill the determining.

Clause 39. The method of clause 25, wherein the prediction data comprises AMVP prediction data of the target block, and the AMVP prediction data of the target block is implicitly derived based on the coding information.

Clause 40. The method of clause 39, wherein the AMVP prediction data comprises at least one of: a normal AMVP prediction, an AMVP based base hypothesis, or an AMVP based additional hypothesis.

Clause 41. The method of clause 39, wherein a predictor or a candidate index of an AMVP based prediction is implicitly derived based on the coding information, or wherein the predictor or the candidate index of an AMVP based hypothesis is implicitly derived based on the coding information.

Clause 42. The method of clause 41, further comprising: constructing a template for each AMVP predictor or AMVP candidate; for each AMVP predictor or AMVP candidate, determining a template matching cost between a first template of the target block and a second template of AMVP predictor or AMVP candidate; and determining a target AMVP predictor with minimum distortion as an implicitly derived AMVP predictor or AMVP candidate.

Clause 43. The method of clause 39, wherein a reference index of a hypothesis is implicitly derived based on the coding information.

Clause 44. The method of clause 43, further comprising: determining, based on a set of neighbor samples coded prior to the target block or a set of reference samples in a set of reference pictures, a distortion or cost from difference reference pictures; and determining the reference index with minimum cost.

Clause 45. The method of clause 25, wherein the prediction data comprises merge prediction data of the target block, and the merge prediction data of the target block is implicitly derived based on the coding information.

Clause 46. The method of clause 45, wherein the merge prediction data comprises at least one of: a normal merge prediction, a variant of the merge prediction, a merge based base hypothesis, or a merge based additional hypothesis.

Clause 47. The method of clause 45, wherein a predictor or a candidate index of a merge based prediction is implicitly derived based on the coding information, or wherein the predictor or the candidate index of a merge based hypothesis is implicitly derived based on the coding information.

Clause 48. The method of clause 47, further comprising: constructing a template for each merge predictor or merge candidate; for each merge predictor or merge candidate, determining a template matching cost between a first template of the target block and a second template of merge predictor or merge candidate; and determining a target merge predictor with minimum distortion as an implicitly derived merge predictor or merge candidate.

Clause 49. The method of any of clauses 25-48, wherein an indication of whether to and/or how to determine prediction data of the target block is indicated at one of the followings: sequence level, group of pictures level, picture level, slice level, or tile group level.

Clause 50. The method of any of clauses 25-48, wherein an indication of whether to and/or how to determine prediction data of the target block is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 51. The method of any of clauses 25-48, wherein an indication of whether to and/or how to determine prediction data of the target block is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 52. The method of any of clauses 25-48, further comprising: determining, based on coding information of the target block, whether to and/or how to determine prediction data of the target block, the coding information including at least one of: a block size, a colour format, a single and/or dual tree partitioning, a colour component, a slice type, or a picture type.

Clause 53. A method of video processing, comprising: determining, during a conversion between a target block of a video and a bitstream of the target block, motion data of a set of additional hypothesis candidates of the target block; reordering the motion data; and performing the conversion based on the reordered motion data.

Clause 54. The method of clause 53, wherein the motion data comprises at least one of: motion information of advanced motion vector prediction (AMVP) coded additional hypothesis candidates, or motion information of merge coded additional hypothesis candidates.

Clause 55. The method of clause 53, wherein the motion data comprises at least one of: a motion vector, a prediction direction, a reference index, a bi-prediction with coding unit (CU)-level weight (BCW) index, half-pel interpolation filter information, or integer motion vector information.

Clause 56. The method of clause 53, wherein motion candidates of merge based additional hypotheses are reordered.

Clause 57. The method of clause 56, wherein the merge based additional hypotheses are generated based on a prediction list different from a regular merge list.

Clause 58. The method of clause 56, wherein the motion candidates to be reordered comprise at least one of: a merge candidate index, a motion vector, a BCW index, IMV information, or half-pel interpolation filter information.

Clause 59. The method of clause 53, wherein motion candidates of AMVP based additional hypotheses are reordered.

Clause 60. The method of clause 59, wherein the AMVP based additional hypotheses are generated based on a prediction list different from a regular AMVP list.

Clause 61. The method of clause 59, wherein the motion candidates to be reordered comprise at least one of: a AMVP candidate index, a motion vector, a BCW index, IMV information, or half-pel interpolation filter information.

Clause 62. The method of clause 53, wherein the reordering is based on a rule of a template cost.

Clause 63. The method of clause 62, wherein the template cost is calculated from a set of neighbor samples of the target block in a current picture and a corresponding template in a reference picture.

Clause 64. The method of clause 53, wherein the reordering is based on a rule of a bilateral matching cost.

Clause 65. The method of clause 64, wherein the bilateral matching cost is calculated based on a corresponding block in a first reference picture and a second corresponding block in a second reference picture.

Clause 66. The method of any of clauses 53-65, wherein an indication of whether to and/or how to reorder the motion data is indicated at one of the followings: sequence level, group of pictures level, picture level, slice level, or tile group level.

Clause 67. The method of any of clauses 53-65, wherein an indication of whether to and/or how to reorder the motion data is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 68. The method of any of clauses 53-65, wherein an indication of whether to and/or how to reorder the motion data is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 69. The method of any of clauses 53-65, further comprising: determining, based on coding information of the target block, whether to and/or how to reorder the motion data, the coding information including at least one of: a block size, a colour format, a single and/or dual tree partitioning, a colour component, a slice type, or a picture type.

Clause 70. A method of video processing, comprising: determining, during a conversion between a target block of a video and a bitstream of the target block, an additional hypothesis of the target block; refining a set of motion candidates of the additional hypothesis of the target block by a decoder side method; and performing the conversion based on the refined set of motion candidates.

Clause 71. The method of clause 70, wherein motion candidates of the additional hypothesis are firstly reordered, and then refined by the decoder side method.

Clause 72. The method of clause 70, wherein the set of motion candidates of the additional hypothesis are firstly refined by the decoder side method, then reordered.

Clause 73. The method of clause 70, wherein the set of motion candidates of the additional hypothesis are firstly refined by the decoder side method, without reordering.

Clause 74. The method of clause 70, wherein the set of motion candidates of the additional hypothesis are further refined by a template matching based method.

Clause 75. The method of clause 70, wherein the set of motion candidates of the additional hypothesis are further refined by a bilateral matching based method.

Clause 76. The method of clause 70, wherein whether and/or how to refine the set of motion candidates of the additional hypothesis depend on coding information of the target block.

Clause 77. The method of clause 76, wherein whether to refine the set of motion candidates of the additional hypothesis depends on a coding method of a base hypothesis of the target block.

Clause 78. The method of clause 77, wherein if the base hypothesis is template matching coded, the set of motion candidates of the additional hypothesis is further refined.

Clause 79. The method of clause 77, wherein if the base hypothesis is bilateral matching coded, the set of motion candidates of the additional hypothesis is further refined.

Clause 80. The method of clause 77, wherein regardless of whether the base hypothesis is bilateral matching coded or template matching coded, the set of motion candidates of the additional hypothesis is further refined.

Clause 81. The method of 70, wherein whether the set of motion candidates of the additional hypothesis is further refined or not is indicated through a syntax element.

Clause 82. The method of clause 81, wherein the syntax element is further indicated indicating whether the set of motion candidates of the additional hypothesis is further refined by template matching or not.

Clause 83. The method of clause 81, wherein the syntax element is further indicated indicating whether the set of motion candidates of the additional hypothesis is further refined by bilateral matching or not.

Clause 84. The method of clause 81, wherein if the additional hypothesis is merge coded, the syntax element is further indicated indicating whether the set of motion candidates of the additional hypothesis if further refined by template matching or not.

Clause 85. The method of clause 81, wherein if the additional hypothesis is merge coded, the syntax element is further indicated indicating whether the set of motion candidates of the additional hypothesis if further refined by bilateral matching or not.

Clause 86. The method of clause 81, wherein if the additional hypothesis is AMVP coded, the syntax element is further indicated indicating whether the set of motion candidates of the additional hypothesis if further refined by template matching or not.

Clause 87. The method of clause 81, wherein if the additional hypothesis is AMVP coded, the syntax element is further indicated indicating whether the set of motion candidates of the additional hypothesis if further refined by bilateral matching or not.

Clause 88. The method of any of clauses 70-87, wherein an indication of whether to and/or how to refine the set of motion candidates of the additional hypothesis is indicated at one of the followings: a sequence level, a group of pictures level, a picture level, a slice level, or a tile group level.

Clause 89. The method of any of clauses 70-87, wherein an indication of whether to and/or how to refine the set of motion candidates of the additional hypothesis is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 90. The method of any of clauses 70-87, wherein an indication of whether to and/or how to refine the set of motion candidates of the additional hypothesis is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 91. The method of any of clauses 70-87, further comprising: determining, based on coding information of the target block, whether to and/or how to refine the set of motion candidates of the additional hypothesis, the coding information including at least one of: a block size, a colour format, a single and/or dual tree partitioning, a colour component, a slice type, or a picture type.

Clause 92. A method of video processing, comprising: determining, during a conversion between a target block of a video and a bitstream of the target block, a prediction of a hypothesis of the target block based on virtual constructed motion data; and performing the conversion based on the prediction.

Clause 93. The method of clause 92, wherein a prediction of an additional hypothesis of the target block is generated based on the virtual constructed motion data.

Clause 94. The method of clause 92, wherein the virtual constructed motion is based on an AMVP-MERGE candidate list.

Clause 95. The method of clause 94, wherein the AMVP-MERGE candidate list is generated based on at least one AMVP motion candidate information and at least one MERGE motion candidate information.

Clause 96. The method of clause 95, wherein the AMVP-MERGE candidate list is reordered.

Clause 97. The method of clause 95, wherein motion candidates in the AMVP-MERGE motion candidate list are refined.

Clause 98. The method of clause 92, wherein the virtual constructed motion data is based on a bi-directional virtual motion candidate.

Clause 99. The method of clause 98, wherein the bi-directional virtual motion candidate is generated based on a certain AMVP candidate list.

Clause 100. The method of clause 98, wherein the bi-directional virtual motion candidate is generated based on a certain MERGE candidate list.

Clause 101. The method of clause 100, wherein the certain MERGE candidate list comprises at least one of: a regular merge candidate list, a merge mode with motion vector difference (MMVD) candidate list, a template matching (TM) merge list, a GEO merge list, a combined inter intra prediction (CIIP) merge list, or a subblock merge list.

Clause 102. The method of clause 92, wherein the bi-directional virtual motion candidate is generated based on a reordered motion candidate list.

Clause 103. The method of clause 92, wherein the bi-directional virtual motion candidate is generated based on a reordered motion candidate list.

Clause 104. The method of clause 92, wherein the virtual constructed motion data is based on a uni-directional virtual motion candidate.

Clause 105. The method of clause 104, wherein the uni-directional virtual motion candidate is generated based on a certain AMVP candidate list.

Clause 106. The method of clause 104, wherein the uni-directional virtual motion candidate is generated based on a certain MERGE candidate list.

Clause 107. The method of clause 106, wherein the certain MERGE candidate list comprises at least one of: a regular merge candidate list, a MMVD candidate list, a TM merge list, a GEO merge list, a CIIP merge list, or a subblock merge list.

Clause 108. The method of clause 104, wherein the uni-directional virtual motion candidate is generated based on a reordered motion candidate list.

Clause 109. The method of clause 104, wherein the uni-directional virtual motion candidate is further refined.

Clause 110. The method of clause 92, wherein a prediction of an additional hypothesis of the target block is generated based on the virtual constructed motion data.

Clause 111. The method of clause 110, wherein if an AMVP-MERGE coded block is perceived as the base hypothesis, at least one additional hypothesis is applied to the AMVP-MERGE coded block, and a final prediction of the AMVP-MERGE coded block is generated by combining the base hypothesis and additional hypotheses together.

Clause 112. The method of clause 92, wherein at least one of: a bi-predicted additional hypothesis or a uni-predicted additional hypothesis is allowed for a multiple hypothesis prediction unit.

Clause 113. The method of clause 112, wherein a predetermined maximum number of bi-directional coded additional hypothesis is allowed for the multiple hypothesis prediction unit.

Clause 114. The method of clause 113, wherein the bi-directional hypothesis is generated based on a virtual generated prediction list.

Clause 115. The method of clause 113, wherein the bi-directional hypothesis is generated based on a bi-directional candidate from a certain merge list.

Clause 116. The method of clause 113, wherein the bi-directional hypothesis is generated based on a bi-directional candidate from a certain AMVP list.

Clause 117. The method of clause 112, wherein a predetermined maximum number of uni-directional coded additional hypotheses are allowed for the multiple hypothesis prediction unit.

Clause 118. The method of clause 112, wherein both uni-predicted additional hypothesis and bi-predicted additional hypothesis are allowed for the multiple hypothesis prediction unit.

Clause 119. The method of clause 112, wherein only bi-predicted additional hypothesis is allowed for the multiple hypothesis prediction unit.

Clause 120. The method of clause 112, wherein only uni-predicted additional hypothesis is allowed for the multiple hypothesis prediction unit.

Clause 121. The method of any of clauses 92-120, wherein an indication of whether to and/or how to generate the prediction of the hypothesis of the target block is indicated at one of the followings: a sequence level, a group of pictures level, a picture level, a slice level, or a tile group level.

Clause 122. The method of any of clauses 92-120, wherein an indication of whether to and/or how to generate the prediction of the hypothesis of the target block is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 123. The method of any of clauses 92-120, wherein an indication of whether to and/or how to generate the prediction of the hypothesis of the target block is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 124. The method of any of clauses 92-120, further comprising: determining, based on coding information of the target block, whether to and/or how to generate the prediction of the hypothesis of the target block, the coding information including at least one of: a block size, a colour format, a single and/or dual tree partitioning, a colour component, a slice type, or a picture type.

Clause 125. The method of any of clauses 1-124, wherein the conversion includes encoding the video unit into the bitstream.

Clause 126. The method of any of clauses 1-124, wherein the conversion includes decoding the video unit from the bitstream.

Clause 127. An apparatus for processing video data comprising a processor and a non-transitory memory with instructions thereon, wherein the instructions upon execution by the processor, cause the processor to perform a method in accordance with any of clauses 1-126.

Clause 128. A non-transitory computer-readable storage medium storing instructions that cause a processor to perform a method in accordance with any of clauses 1-126.

Clause 129. A non-transitory computer-readable recording medium stores a bitstream of a video which is generated by a method performed by a video processing apparatus, wherein the method comprises: determining a first prediction and a second prediction associated with a target block of the video, the target block being applied with a multiple hypothesis prediction coding mode; applying a process associated with a template of the target block by to the target block blending the first and second predictions; and generating a bitstream of the target block according to the process associated with the template.

Clause 130. A method for storing bitstream of a video, comprises: determining a first prediction and a second prediction associated with a target block of the video, the target block being applied with a multiple hypothesis prediction coding mode; applying a process associated with a template of the target block by blending the first and second predictions; generating a bitstream of the target block according to the process associated with the template; and storing the bitstream in a non-transitory computer-readable recording medium.

Clause 131. A non-transitory computer-readable recording medium stores a bitstream of a video which is generated by a method performed by a video processing apparatus, wherein the method comprises: determining prediction data of a target block of the video based on coding information of the target block; and generating a bitstream of the target block based on the prediction data.

Clause 132. A method for storing bitstream of a video, comprises: determining prediction data of a target block of the video based on coding information of the target block; generating a bitstream of the target block based on the prediction data; and storing the bitstream in a non-transitory computer-readable recording medium.

Clause 133. A non-transitory computer-readable recording medium stores a bitstream of a video which is generated by a method performed by a video processing apparatus, wherein the method comprises: determining, motion data of a set of additional hypothesis candidates of a target block of the video; reordering the motion data; and generating a bitstream of the target block based on the reordered motion data.

Clause 134. A method for storing bitstream of a video, comprises: determining, motion data of a set of additional hypothesis candidates of a target block of the video; reordering the motion data; generating a bitstream of the target block based on the reordered motion data; and storing the bitstream in a non-transitory computer-readable recording medium.

Clause 135. A non-transitory computer-readable recording medium stores a bitstream of a video which is generated by a method performed by a video processing apparatus, wherein the method comprises: determining an additional hypothesis of a target block of the video; refining a set of motion candidates of the additional hypothesis of the target block by a decoder side method; and generating a bitstream of the target block based on the refined set of motion candidates.

Clause 136. A method for storing bitstream of a video, comprises: determining an additional hypothesis of a target block of the video; refining a set of motion candidates of the additional hypothesis of the target block by a decoder side method; generating a bitstream of the target block based on the refined set of motion candidates; and storing the bitstream in a non-transitory computer-readable recording medium.

Clause 137. A non-transitory computer-readable recording medium stores a bitstream of a video which is generated by a method performed by a video processing apparatus, wherein the method comprises: determining a prediction of a hypothesis of a target block based of the video on virtual constructed motion data; and generating a bitstream of the target block based on the prediction.

Clause 138. A method for storing bitstream of a video, comprises determining a prediction of a hypothesis of a target block based of the video on virtual constructed motion data; generating a bitstream of the target block based on the prediction; and storing the bitstream in a non-transitory computer-readable recording medium.

Example Device

FIG. 28 illustrates a block diagram of a computing device 2800 in which various embodiments of the present disclosure can be implemented. The computing device 2800 may be implemented as or included in the source device 110 (or the video encoder 114 or 200) or the destination device 120 (or the video decoder 124 or 300).

It would be appreciated that the computing device 2800 shown in FIG. 28 is merely for purpose of illustration, without suggesting any limitation to the functions and scopes of the embodiments of the present disclosure in any manner.

As shown in FIG. 28, the computing device 2800 includes a general-purpose computing device 2800. The computing device 2800 may at least comprise one or more processors or processing units 2810, a memory 2820, a storage unit 2830, one or more communication units 2840, one or more input devices 2850, and one or more output devices 2860.

In some embodiments, the computing device 2800 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 2800 can support any type of interface to a user (such as "wearable" circuitry and the like).

The processing unit 2810 may be a physical or virtual processor and can implement various processes based on programs stored in the memory 2820. In a multi-processor system, multiple processing units execute computer executable instructions in parallel so as to improve the parallel processing capability of the computing device 2800. The processing unit 2810 may also be referred to as a central processing unit (CPU), a microprocessor, a controller or a microcontroller.

The computing device 2800 typically includes various computer storage medium. Such medium can be any medium accessible by the computing device 2800, including, but not limited to, volatile and non-volatile medium, or detachable and non-detachable medium. The memory 2820 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 2830 may be any detachable or non-detachable medium and may include a machine-readable medium such as a memory, flash memory drive, magnetic disk or another other media, which can be used for storing information and/or data and can be accessed in the computing device 2800.

The computing device 2800 may further include additional detachable/non-detachable, volatile/non-volatile memory medium. Although not shown in FIG. 28, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 2840 communicates with a further computing device via the communication medium. In addition, the functions of the components in the computing device 2800 can be implemented by a single computing cluster or multiple computing machines that can communicate via communication connections. Therefore, the computing device 2800 can operate in a networked environment using a logical connection with one or more other servers, networked personal computers (PCs) or further general network nodes.

The input device 2850 may be one or more of a variety of input devices, such as a mouse, keyboard, tracking ball, voice-input device, and the like. The output device 2860 may be one or more of a variety of output devices, such as a display, loudspeaker, printer, and the like. By means of the communication unit 2840, the computing device 2800 can further communicate with one or more external devices (not shown) such as the storage devices and display device, with one or more devices enabling the user to interact with the computing device 2800, or any devices (such as a network card, a modem and the like) enabling the computing device 2800 to communicate with one or more other computing devices, if required. Such communication can be performed via input/output (I/O) interfaces (not shown).

In some embodiments, instead of being integrated in a single device, some or all components of the computing device 2800 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 2800 may be used to implement video encoding/decoding in embodiments of the present disclosure. The memory 2820 may include one or more video coding modules 2825 having one or more program instructions. These modules are accessible and executable by the processing unit 2810 to perform the functionalities of the various embodiments described herein.

In the example embodiments of performing video encoding, the input device 2850 may receive video data as an input 2870 to be encoded. The video data may be processed, for example, by the video coding module 2825, to generate an encoded bitstream. The encoded bitstream may be provided via the output device 2860 as an output 2880.

In the example embodiments of performing video decoding, the input device 2850 may receive an encoded bitstream as the input 2870. The encoded bitstream may be processed, for example, by the video coding module 2825, to generate decoded video data. The decoded video data may be provided via the output device 2860 as the output 2880.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method of video processing, comprising:
determining, during a conversion between a target block of a video and a bitstream of the video, a first prediction and a second prediction associated with the target block, the target block being applied with a multiple hypothesis prediction coding mode;
applying a process associated with a template of the target block to the target block by blending the first and second predictions; and performing the conversion according to the process associated with the template,
wherein the first prediction of the template is blended with the second prediction of the template, if one of the followings is calculated:
a template matching cost of the target block,
a template matching distortion of the target block, or
a template matching error of the target block.

2. The method of claim 1, wherein the process associated with the template comprises at least one of:
a generation of the template of the target block,
a template matching cost of the target block,
a template matching distortion of the target block, or
a template matching error of the target block, or
wherein the multiple hypothesis prediction coding mode comprises at least one of: a combined inter and intra prediction (CIIP) mode, a multiple hypothesis prediction (MHP) mode, or a geometric partitioning mode (GPM), or
wherein at least one of the followings is used for a decode side method:
a generation of the template of the target block,
a template matching cost of the target block,
a template matching distortion of the target block, or
a template matching error of the target block; and
wherein the decode side method comprises at least one of:
a template matching,
a bilateral matching,
a candidate list reordering,
a candidate index implicit derivation, or
a weight index implicit derivation, or
wherein the template is generated from a prior-coded sample other than a sample inside a current coding block of the target block.

3. The method of claim 1, wherein the second prediction is applied to the template, and
wherein the method further comprising: constructing a final template by combining the first prediction and the second prediction of the template, or
wherein an intra prediction of the template is applied to the template and combined with the first prediction or a reconstruction sample of the template, and wherein if the multiple hypothesis prediction coding mode combines an inter predication and an intra prediction together, the intra prediction is applied to the template, and wherein the first and second predictions of the template are combined for a template cost computation, or
wherein an inter prediction of the template is applied to the template and combined with the first prediction or a reconstruction sample of the template, and wherein if the multiple hypothesis prediction coding mode combines a first inter prediction and a second inter prediction together, the inter prediction is applied to the template, and wherein the first and second predictions of the template are combined for a template cost computation.

4. The method of claim 1, wherein the number of prediction method applied to the template depends on the multiple hypothesis prediction coding mode, and wherein if the multiple hypothesis prediction coding mode blends from a first number of predictions, a second number of prediction method are blended for a template cost computation, or
wherein a type of prediction applied to the template depends on the multiple hypothesis prediction coding mode, and wherein a first intra prediction mode used to generate a second intra prediction of the template is based on a second intra prediction mode of one of intra hypotheses of the target block, or wherein first motion information used to generate a second inter prediction of the template is based on second motion information of one of inter hypotheses of the target block.

5. The method of claim 1, wherein the first prediction of the template is generated based on a pre-defined rule, and wherein for bilateral matching, a first prediction of a first template is generated from samples in a first reference picture associated with the target block, and a first prediction of a second template is generated from samples in a second reference picture associated with the target block, or wherein for template matching, a first prediction of a first template is generated from a first set of neighbor samples of the target block in a current picture, and a first prediction of a second template is generated from a second set of neighbor samples in a reference picture, or wherein for GPM mode index reordering, the template is constructed by combining a first template and a second template, the first template is derived from a first prediction motion and the second template is derived from a second prediction motion.

6. The method of claim 1, further comprising:

determining prediction data of the target block based on coding information of the target block; and performing the conversion comprises performing the conversion based on the prediction data, and wherein the prediction data comprises multiple hypothesis data of the target block, and the multiple hypothesis data of the target block is implicitly derived based on the coding information, and wherein a weight index or a weight value of a hypothesis is implicitly derived based on the coding information, and wherein the coding information comprises at least one of: mode information of a neighbor coded video unit associated with the target block, or a sample value of the neighbor coded video unit associated with the target block, or wherein the weight index for combining a first hypothesis and a second hypothesis for MHP is implicitly derived based on template matching cost, or wherein the hypothesis comprises at least one of: an additional hypothesis of the target block, or a base hypothesis of the target block, or wherein the multiple hypothesis data comprises at least one of: coding information of an additional hypothesis of the target block, or coding information of a base hypothesis of the target block, or wherein how to predict an additional hypothesis of the target block is implicitly derived, and the method further comprising: determining, based on the coding information, whether an additional hypothesis of the target block is coded based on advanced motion vector prediction (AMVP) or merge prediction.

7. The method of claim 6, wherein the determining is based on a decoder side template matching which is associated with a first template in a current picture and a second template in a reference picture, and wherein the first template in the current picture is constructed from a set of neighbor samples adjacent to the target block, or wherein a cost between the first template and the second template is used as a criterion to fulfill the determining, or wherein the determining is based on a decoder side bilateral matching which is associated with a first reference unit in a first reference picture and a second reference unit in a second reference picture, and wherein a cost between the first reference unit and the second reference unit is used as a criterion to fulfill the determining.

8. The method of claim 6, wherein the prediction data comprises AMVP prediction data of the target block, and the AMVP prediction data of the target block is implicitly derived based on the coding information, and wherein the AMVP prediction data comprises at least one of: a normal AMVP prediction, an AMVP based base hypothesis, or an AMVP based additional hypothesis, or wherein a predictor or a candidate index of an AMVP based prediction is implicitly derived based on the coding information, or wherein the predictor or the candidate index of an AMVP based hypothesis is implicitly derived based on the coding information, and the method further comprising:

constructing a template for each AMVP predictor or AMVP candidate;

for each AMVP predictor or AMVP candidate, determining a template matching cost between a first template of the target block and a second template of AMVP predictor or AMVP candidate; and determining a target AMVP predictor with minimum distortion as an implicitly derived AMVP predictor or AMVP candidate, or wherein a reference index of a hypothesis is implicitly derived based on the coding information, and the method further comprising:

determining, based on a set of neighbor samples coded prior to the target block or a set of reference samples in a set of reference pictures, a distortion or cost from difference reference pictures; and determining the reference index with minimum cost.

9. The method of claim 6, wherein the prediction data comprises merge prediction data of the target block, and the merge prediction data of the target block is implicitly derived based on the coding information, and wherein the merge prediction data comprises at least one of: a normal merge prediction, a variant of the merge prediction, a merge based base hypothesis, or a merge based additional hypothesis, or wherein a predictor or a candidate index of a merge based prediction is implicitly derived based on the coding information, or wherein the predictor or the candidate index of a merge based hypothesis is implicitly derived based on the coding information, and the method further comprising:

constructing a template for each merge predictor or merge candidate;

for each merge predictor or merge candidate, determining a template matching cost between a first template of the target block and a second template of merge predictor or merge candidate; and determining a target merge predictor with minimum distortion as an implicitly derived merge predictor or merge candidate.

10. The method of claim 1, further comprising:

determining motion data of a set of additional hypothesis candidates of the target block;

reordering the motion data; and performing the conversion comprises performing the conversion based on the reordered motion data, and wherein the motion data comprises at least one of: motion information of advanced motion vector prediction (AMVP) coded additional hypothesis candidates, or motion information of merge coded additional hypothesis candidates, or wherein the motion data comprises at least one of:
a motion vector,
a prediction direction,
a reference index,
a bi-prediction with coding unit (CU)-level weight (BCW) index,
half-pel interpolation filter information, or
integer motion vector information, or wherein motion candidates of merge based additional hypotheses are reordered, and
wherein the merge based additional hypotheses are generated based on a prediction list different from a regular merge list, or
wherein the motion candidates to be reordered comprise at least one of: a merge candidate index, a motion vector, a BCW index, motion vector precision/resolution information, or half-pel interpolation filter information.

11. The method of claim 10, wherein motion candidates of AMVP based additional hypotheses are reordered, and
wherein the AMVP based additional hypotheses are generated based on a prediction list different from a regular AMVP list, or
wherein the motion candidates to be reordered comprise at least one of: a AMVP candidate index, a motion vector, a BCW index, IMV information, or half-pel interpolation filter information, or
wherein the reordering is based on a rule of a template cost, and wherein the template cost is calculated from a set of neighbor samples of the target block in a current picture and a corresponding template in a reference picture, or
wherein the reordering is based on a rule of a bilateral matching cost, and wherein the bilateral matching cost is calculated based on a corresponding block in a first reference picture and a second corresponding block in a second reference picture.

12. The method of claim 1, further comprising:
determining an additional hypothesis of the target block;
refining a set of motion candidates of the additional hypothesis of the target block by a decoder side method; and
performing the conversion comprises performing the conversion based on the refined set of motion candidates.

13. The method of claim 12, wherein motion candidates of the additional hypothesis are firstly reordered, and then refined by the decoder side method, or
wherein the set of motion candidates of the additional hypothesis are firstly refined by the decoder side method, then reordered, or
wherein the set of motion candidates of the additional hypothesis are firstly refined by the decoder side method, without reordering, or
wherein the set of motion candidates of the additional hypothesis are further refined by a template matching based method, or
wherein the set of motion candidates of the additional hypothesis are further refined by a bilateral matching based method, or wherein whether and/or how to refine the set of motion candidates of the additional hypothesis depend on coding information of the target block, and wherein whether to refine the set of motion candidates of the additional hypothesis depends on a coding method of a base hypothesis of the target block, and
wherein if the base hypothesis is template matching coded, the set of motion candidates of the additional hypothesis is further refined, or
wherein if the base hypothesis is bilateral matching coded, the set of motion candidates of the additional hypothesis is further refined, or
wherein regardless of whether the base hypothesis is bilateral matching coded or template matching coded, the set of motion candidates of the additional hypothesis is further refined.

14. The method of claim 12, wherein whether the set of motion candidates of the additional hypothesis is further refined or not is indicated through a syntax element and
wherein the syntax element is further indicated indicating whether the set of motion candidates of the additional hypothesis is further refined by template matching or not, or
wherein the syntax element is further indicated indicating whether the set of motion candidates of the additional hypothesis is further refined by bilateral matching or not, or
wherein if the additional hypothesis is merge coded, the syntax element is further indicated indicating whether the set of motion candidates of the additional hypothesis if further refined by template matching or not, or
wherein if the additional hypothesis is merge coded, the syntax element is further indicated indicating whether the set of motion candidates of the additional hypothesis if further refined by bilateral matching or not, or
wherein if the additional hypothesis is AMVP coded, the syntax element is further indicated indicating whether the set of motion candidates of the additional hypothesis if further refined by template matching or not, or
wherein if the additional hypothesis is AMVP coded, the syntax element is further indicated indicating whether the set of motion candidates of the additional hypothesis if further refined by bilateral matching or not.

15. The method of claim 1, further comprising:
determining a prediction of a hypothesis of the target block based on virtual constructed motion data; and
performing the conversion comprises performing the conversion based on the prediction, and wherein a prediction of an additional hypothesis of the target block is generated based on the virtual constructed motion data, or
wherein the virtual constructed motion is based on an AMVP-MERGE candidate list, and wherein the AMVP-MERGE candidate list is generated based on at least one AMVP motion candidate information and at least one MERGE motion candidate information, and wherein the AMVP-MERGE candidate list is reordered, or
wherein motion candidates in the AMVP-MERGE motion candidate list are refined, or
wherein the virtual constructed motion data is based on a bi-directional virtual motion candidate, and
wherein the bi-directional virtual motion candidate is generated based on a certain AMVP candidate list, or
wherein the bi-directional virtual motion candidate is generated based on a certain MERGE candidate list, and wherein the certain MERGE candidate list comprises at least one of: a regular merge candidate list, a merge mode with motion vector difference (MMVD) candidate list, a template matching (TM) merge list, a GEO merge list, a combined inter intra prediction (CIIP) merge list, or a subblock merge list, or wherein the bi-directional virtual motion candidate is generated based on a reordered motion candidate list, or wherein the bi-directional virtual motion candidate is generated based on a reordered motion candidate list.

16. The method of claim 15, wherein the virtual constructed motion data is based on a uni-directional virtual motion candidate, and wherein the uni-directional virtual motion candidate is generated based on a certain AMVP candidate list, or wherein the uni-directional virtual motion candidate is generated based on a certain MERGE candidate list, and wherein the certain MERGE candidate list comprises at least one of: a regular merge candidate list, a MMVD candidate list, a TM merge list, a GEO merge list, a CIIP merge list, or a subblock merge list, or wherein the uni-directional virtual motion candidate is generated based on a reordered motion candidate list, or wherein the uni-directional virtual motion candidate is further refined, or wherein a prediction of an additional hypothesis of the target block is generated based on the virtual constructed motion data, and wherein if an AMVP-MERGE coded block is perceived as the base hypothesis, at least one additional hypothesis is applied to the AMVP-MERGE coded block, and a final prediction of the AMVP-MERGE coded block is generated by combining the base hypothesis and additional hypotheses together.

17. The method of claim 15, wherein at least one of: a bi-predicted additional hypothesis or a uni-predicted additional hypothesis is allowed for a multiple hypothesis prediction unit, and wherein a predetermined maximum number of bi-directional coded additional hypothesis is allowed for the multiple hypothesis prediction unit, and wherein the bi-directional hypothesis is generated based on a virtual generated prediction list, or wherein the bi-directional hypothesis is generated based on a bi-directional candidate from a certain merge list, or wherein the bi-directional hypothesis is generated based on a bi-directional candidate from a certain AMVP list, or wherein a predetermined maximum number of uni-directional coded additional hypotheses are allowed for the multiple hypothesis prediction unit, or wherein both uni-predicted additional hypothesis and bi-predicted additional hypothesis are allowed for the multiple hypothesis prediction unit, or wherein only bi-predicted additional hypothesis is allowed for the multiple hypothesis prediction unit, or wherein only uni-predicted additional hypothesis is allowed for the multiple hypothesis prediction unit.

18. The method of claim 1, wherein the conversion includes encoding the video unit into the bitstream, or wherein the conversion includes decoding the video unit from the bitstream.

19. The method of claim 1, further comprising:

storing the bitstream in a non-transitory computer-readable recording medium.

20. An apparatus for processing video data comprising a processor and a non-transitory memory with instructions thereon, wherein the instructions upon execution by the processor, cause the processor to perform a method comprising:

determining, during a conversion between a target block of a video and a bitstream of the video, a first prediction and a second prediction associated with the target block, the target block being applied with a multiple hypothesis prediction coding mode;

applying a process associated with a template of the target block to the target block by blending the first and second predictions; and performing the conversion according to the process associated with the template, wherein the first prediction of the template is blended with the second prediction of the template, if one of the followings is calculated:

a template matching cost of the target block, a template matching distortion of the target block, or a template matching error of the target block.

21. A non-transitory computer-readable storage medium storing instructions that cause a processor to perform a method comprising:

determining, during a conversion between a target block of a video and a bitstream of the video, a first prediction and a second prediction associated with the target block, the target block being applied with a multiple hypothesis prediction coding mode;

applying a process associated with a template of the target block to the target block by blending the first and second predictions; and performing the conversion according to the process associated with the template, wherein the first prediction of the template is blended with the second prediction of the template, if one of the followings is calculated:

a template matching cost of the target block, a template matching distortion of the target block, or a template matching error of the target block.

* * * * *